United States Patent [19]

Tanaka et al.

[11] Patent Number: 5,799,023
[45] Date of Patent: Aug. 25, 1998

[54] MESSAGE RECEIVER

[75] Inventors: Noriko Tanaka; Hiroshi Uranaka, both of Tokyo; Akio Uesugi, Yokohama; Takashi Hamada, Tokyo, all of Japan

[73] Assignee: Matsushita Electric Industrial Co., Ltd., Osaka, Japan

[21] Appl. No.: 620,646

[22] Filed: Mar. 22, 1996

[30] Foreign Application Priority Data

Jul. 19, 1995 [JP] Japan ..................... 7-183104
Jul. 31, 1995 [JP] Japan ..................... 7-195140

[51] Int. Cl.⁶ ............................................. G06F 11/00
[52] U.S. Cl. ................................... 371/5.1; 371/39.1
[58] Field of Search ........................ 371/30, 40, 27.7, 371/5.1, 39.1; 455/343; 340/825.44; 375/316

[56] References Cited

U.S. PATENT DOCUMENTS

| | | | |
|---|---|---|---|
| 4,802,173 | 1/1989 | Baggen | 371/2.1 |
| 5,142,699 | 8/1992 | Sato et al. | 455/343 |
| 5,274,369 | 12/1993 | Tsunoda et al. | 340/825.44 |
| 5,493,285 | 2/1996 | Yoshizawa | 340/825.44 |
| 5,623,519 | 4/1997 | Babcock et al. | 375/316 |

Primary Examiner—Stephen M. Baker
Assistant Examiner—McDieunel Marc
Attorney, Agent, or Firm—Pollock, Vande Sande & Priddy

[57] ABSTRACT

In a message receiving apparatus, a radio paging signal is demodulated into a baseband signal. The baseband signal is decoded into corresponding data. Address information is recovered from the data. Message information is recovered from the data. The recovered message information is subjected to an error correction process. On the other hand, the recovered address information is prevented from being subjected to the error correction process.

4 Claims, 14 Drawing Sheets

| ERROR PATTERN | ERROR BIT NUMBER |
|---|---|
| 00000000 | 0 |
| 00000001 | 1 |
| 00000010 | 1 |
| 00000011 | 2 |
| 00000100 | 1 |
| . | . |
| . | . |
| . | . |
| 11111111 | 8 |

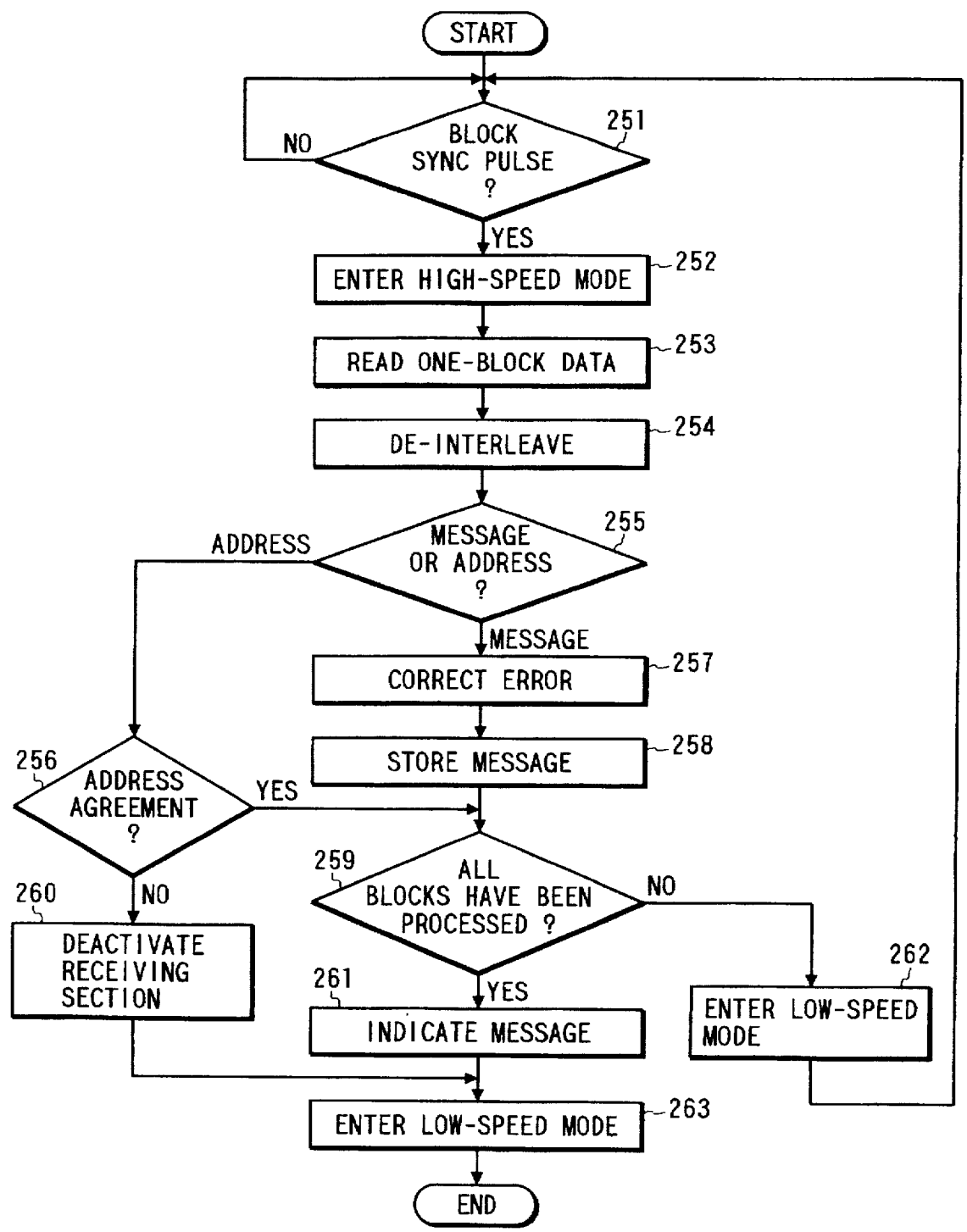

| ERROR PATTERN (X) | ERROR BIT NUMBER EN (X) |
|---|---|
| 00000000 | 0 |
| 00000001 | 1 |
| 00000010 | 1 |
| 00000011 | 2 |
| 00000100 | 1 |
| . | . |
| . | . |
| . | . |
| 11111111 | 8 |

MESSAGE RECEIVER

BACKGROUND OF THE INVENTION

1. Field of the Invention

This invention relates to a message receiver such as a paging receiver or a selective call receiver.

2. Description of the Prior Art

In a typical radio paging communication network, different identification (ID) signals are assigned to paging receivers respectively. Any one of the paging receivers can be called by using an ID signal assigned thereto. Generally, a signal representing a message is transmitted to the called paging receiver, and the message is visualized on a display of the paging receiver.

In such a radio paging communication network, as handled messages lengthen, the numbers of errors in message signals recovered by paging receivers increase and also the rates of electric power consumed by the paging receivers increase.

Each of general paging receivers includes a radio wave receiving section and a CPU. The CPU tends to generate radio noise which interferes with the radio wave receiving section. As the number of steps of effective operation of the CPU per unit time (that is, the activity of the CPU) increases, the level of radio noise generated by the CPU rises.

U.S. Pat. No. 5,142,699 teaches a way of suppressing the level of radio noise generated by a CPU driving clock signal during a time period for which a radio wave receiving section operates. Specifically, U.S. Pat. No. 5,142,699 discloses a radio paging receiver including a receiving section, a decoder section, and a CPU for distinguishing a specific one of a plurality of call signals and processing a specific message signal succeeding the specific call signal into a processed message signal. The receiving section is intermittently put into operation. The decoder section is put into operation in accordance with a first clock signal which is supplied from a first clock generator. A switching circuit selectively connects the CPU with the first clock generator and a second clock generator. The CPU is put into operation in accordance with a second clock signal which is supplied from the second clock generator when the receiving section does not operate. The frequency of the second clock signal is much higher than that of the first clock signal. Therefore, the CPU processes the specific message signal into the processed message signal at a rapid processing speed in accordance with the second clock signal when the receiving section is not put into operation. In general, the CPU is driven by the first clock signal when the receiving section operates.

SUMMARY OF THE INVENTION

It is an object of this invention to provide an improved message receiver.

A first aspect of this invention provides a message receiving apparatus comprising first means for demodulating a radio paging signal into a baseband signal; second means for decoding the baseband signal into corresponding data; third means for recovering address information from the data generated by the second means; fourth means for recovering message information from the data generated by the second means; fifth means for subjecting the recovered message information to an error correction process; and sixth means for preventing the recovered address information from being subjected to the error correction process.

A second aspect of this invention is based on the first aspect thereof, and provides a message receiving apparatus further comprising seventh means for deciding whether or not the address information recovered by the third means is substantially equal to predetermined address information, and eighth means for visualizing correction-resultant message information generated by the fifth means in cases where the seventh means decides that the address information recovered by the third means is substantially equal to the predetermined address information.

A third aspect of this invention is based on the second aspect thereof, and provides a message receiving apparatus wherein the seventh means comprises means for detecting error bits in the recovered address information which differ in logic state from corresponding bits in the predetermined address information, means for calculating a number of the detected error bits, and means for deciding whether or not the address information recovered by the third means is substantially equal to the predetermined address information in response to the calculated error bit number.

A fourth aspect of this invention is based on the first aspect thereof, and provides a message receiving apparatus further comprising seventh means for deciding whether or not the address information recovered by the third means is substantially equal to predetermined address information, and eighth means for deactivating the first means during a given time interval in cases where the seventh means decides that the address information recovered by the third means is not substantially equal to the predetermined address information.

A fifth aspect of this invention is based on the fourth aspect thereof, and provides a message receiving apparatus wherein the seventh means comprises means for detecting error bits in the recovered address information which differ in logic state from corresponding bits in the predetermined address information, means for calculating a number of the detected error bits, and means for deciding whether or not the address information recovered by the third means is substantially equal to the predetermined address information in response to the calculated error bit number.

A sixth aspect of this invention provides a message receiving apparatus comprising first means for demodulating a radio paging signal into a baseband signal; second means for decoding the baseband signal into corresponding data; a CPU alternately executing processing of the data and another job; third means for generating first and second clock signals having first and second predetermined frequencies respectively, the first predetermined frequency being higher than the second predetermined frequency; fourth means for operating the CPU in response to the first clock signal when the CPU executes the processing of the data; and fifth means for operating the CPU in response to the second clock signal when the CPU executes said other job; wherein there is provided a clock generator generating a frequency at which the CPU has a speed of data processing of "m"×"n" bits during a time for which a receiving section receives "n"×"α" bits in the case where an error correction ability in the CPU is "α" bits when data interleaved in unit of "m" bits/word×"n" words.

A seventh aspect of this invention provides a message receiving apparatus comprising first means for demodulating a radio paging signal into a baseband signal; second means for decoding the baseband signal into corresponding data; third means for detecting a bit error rate of the data generated by the second means; fourth means for deciding whether or not the detected bit error rate is higher than a predetermined reference rate; fifth means for storing the data generated by the second means; sixth means for reading out the data from the fifth means and processing the readout data; and seventh means for, in cases where the fourth means decides that the detected bit error rate is higher than the predetermined reference rate, suspending operation of the sixth means until a moment after the data stored in the fifth means comes into correspondence with a whole of the radio paging signal, and then starting the operation of the sixth means after the data stored in the fifth means comes into correspondence with a whole of the radio paging signal.

BRIEF DESCRIPTION OF THE DRAWINGS

FIG. 8 is a flowchart of a segment of a program for controlling a CPU in FIG. 7.

DESCRIPTION OF THE PREFERRED EMBODIMENTS

First Embodiment

Figure 1:
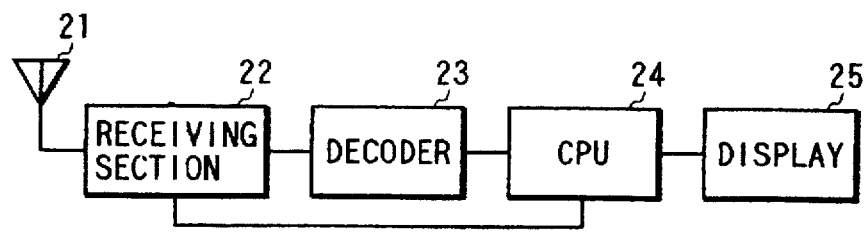
FIG. 1 is a block diagram of a radio message receiver according to a first embodiment of this invention.

With reference to FIG. 1, a radio message receiver (a radio paging receiver) includes an antenna 21 followed by a receiving section 22. The antenna 21 serves to catch a radio wave signal transmitted from, for example, a base station.

Normally, the radio wave signal includes a paging signal having sync information, address information, and message information. The sync information precedes the address information and the message information. The address information precedes the message information. The address information includes identification code information. A radio wave signal caught by the antenna 21 is fed to the receiving section 22. The receiving section 22 demodulates the radio wave signal into a corresponding baseband signal.

A decoder 23 following the receiving section 22 receives the baseband signal therefrom, and decodes the baseband signal into corresponding data.

The decoder 23 is connected to a CPU 24 having a combination of an I/O port (an interface), a processing section, a RAM, and a ROM. The CPU 24 may be replaced by a microcomputer, a DSP, or another similar device. The CPU 24 receives the data from the decoder 23. The CPU 24 recovers identification code information (address information) from the received data. The CPU 24 is connected to a display 25. The CPU 24 is also connected to the receiving section 22. The CPU 24 operates in accordance with a program stored in the internal ROM.

The radio message receiver of FIG. 1 has previously-assigned identification code information (predetermined identification code information or predetermined address information) stored in the ROM within the CPU 24. The predetermined identification code information (the predetermined address information) may be stored in a ROM outside the CPU 24.

According to the program, the CPU 24 compares the recovered identification code information (the recovered address information) with the predetermined identification code information (the predetermined address information). When the recovered identification code information (the recovered address information) substantially agrees with the predetermined identification code information (the predetermined address information), the CPU 24 recovers message information from the received data. Then, the CPU 24 feeds the recovered message information to the display 25 and controls the display 25 so that the recovered message information will be visualized by the display 25.

When the recovered identification code information (the recovered address information) appreciably disagrees with the predetermined identification code information (the predetermined address information), the CPU 24 does not recover message information from the received data so that the activity of the CPU 24 is prevented from increasing. This is advantageous in suppressing the level of radio noise generated by the CPU 24. In addition, the CPU 24 deactivates the receiving section 22 to save electric power. Furthermore, the CPU 24 holds the display 25 deactivated. Therefore, in this case, any message information is not visualized by the display 25.

Figure 2:
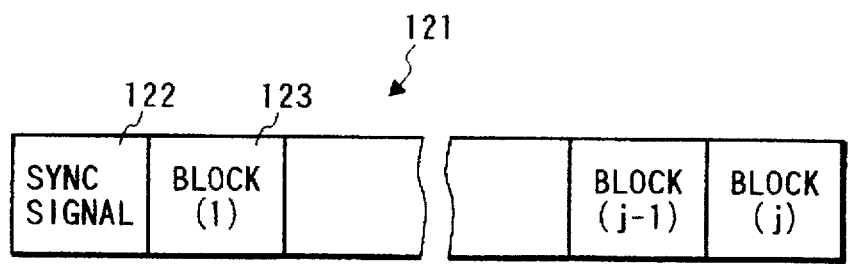
FIG. 2 is a diagram of a format of a paging signal.

FIG. 2 shows a format of a paging signal 121. A head of the paging signal 121 is a sync signal (a bit sync signal) 122 successively followed by blocks 123 having data. The sync signal 122 has a sequence of bits in predetermined logic states corresponding to a given bit pattern (a sync bit pattern). Data in each block 123 is interleaved in unit of "n" words, where "n" denotes a given integer. The total number of the blocks 123 is equal to a given number "j". In general, one or more former blocks 123 represent identification code information (address information) while latter blocks 123 represent message information.

Figure 3:
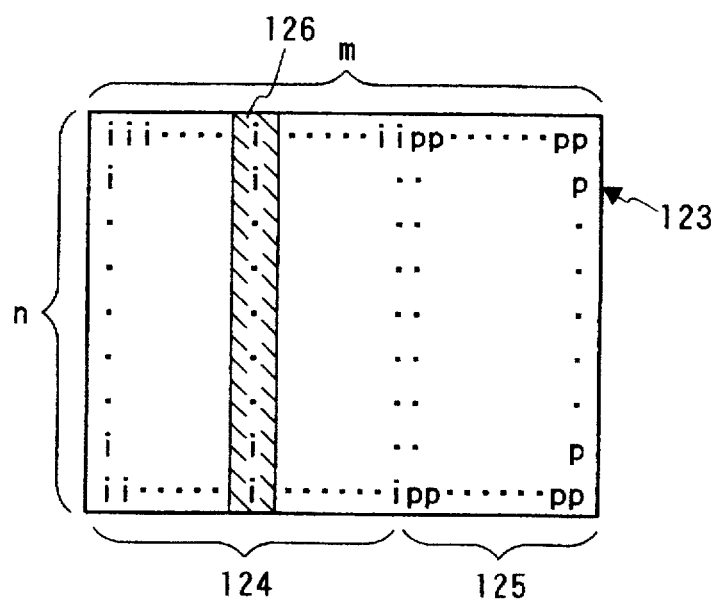
FIG. 3 is a diagram of a two-dimensional expression of data in one block.

FIG. 3 shows a two-dimensional expression of data in one block 123. As shown in FIG. 3, one block has a capacity of "m" bits by "n" words, where "m" denotes a given integer. Each word has bits 124 representing main information, and bits 125 representing error correction code information. The main information contains identification code information (address information) or message information. A used error correction code has an error correction ability corresponding to "α" bits, where "α" denotes a given integer. In FIG. 3, the numeral 126 denotes an n-bit data unit subjected to an interleaving process and composed of equal-order-number bits in the respective words. In a base station (a transmitting station), data in one block 123 is divided into "m" data units. The base station sequentially transmit "m" data units for every block 123.

The decoder 23 includes a bit sync section for generating a sampling clock signal from the output signal of the receiving section 22 which corresponds to a bit sync signal 122 in a paging signal 121. The decoder 23 includes a sampling section which periodically samples the output signal of the receiving section 22 in response to the sampling clock signal to decode the output signal of the receiving section 22 into first data bit by bit. The decoder 23 includes a de-interleaving section for de-interleaving the first data into second data. The decoder 23 includes a pair of buffer memories each having a capacity corresponding to one block 123 in a paging signal 121. Portions of the second data which correspond to respective blocks 123 in a paging signal 121 are sequentially and alternately written into the buffer memories.

Generally, one of the buffer memories in the decoder 23 is subjected to a data writing process while the other buffer memory is accessed by the CPU 24 so that data (the second data) is read out therefrom by the CPU 24.

Figure 4:
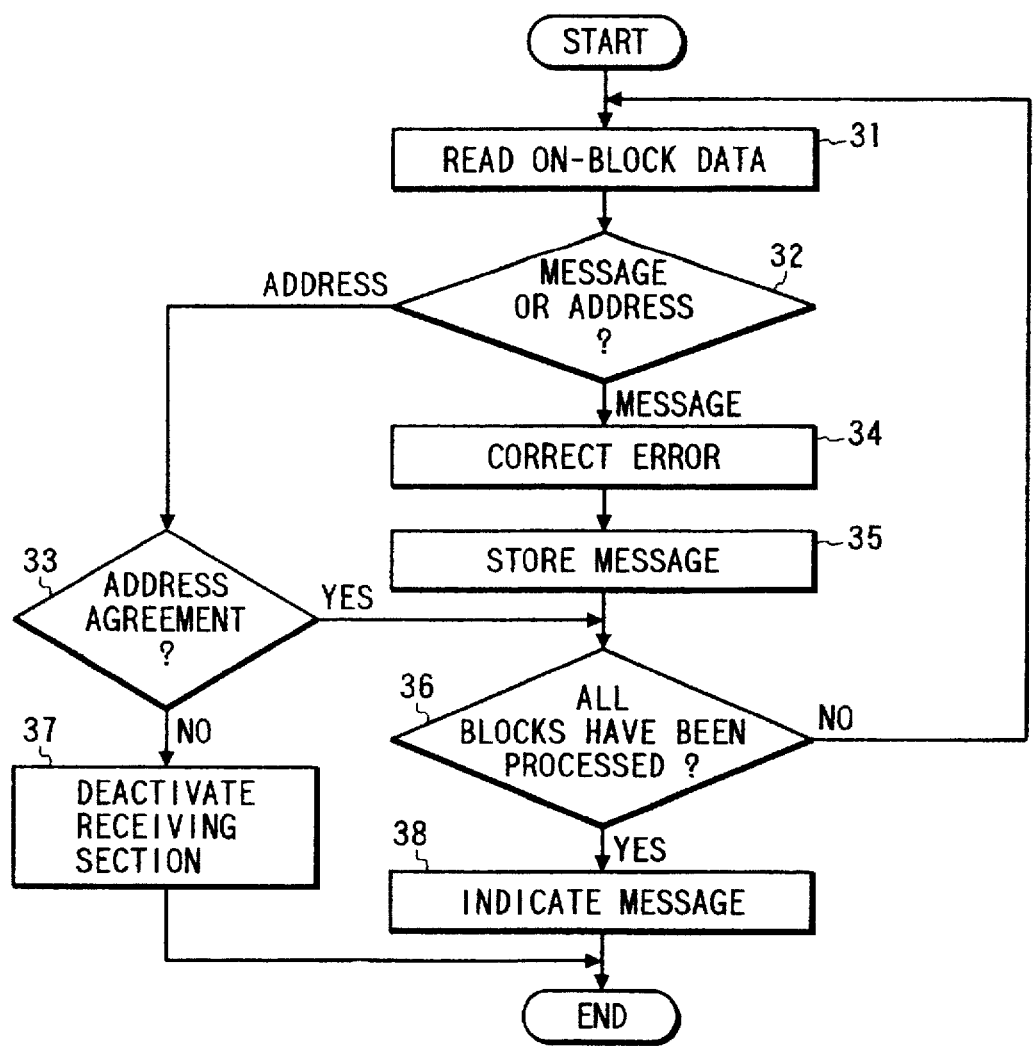
FIG. 4 is a flowchart of a segment of a program for controlling a CPU in FIG. 1.

The CPU 24 operates in accordance with a program stored in the internal ROM. FIG. 4 is a flowchart of a segment of the program which is executed each time a paging signal 121 is received.

As shown in FIG. 4, a first step 31 of the program segment reads out newest 1-block data from one of the buffer memories in the decoder 23.

A step 32 following the step 31 decides whether the readout 1-block data represents address information (identification code information) or message information. When the readout 1-block data represents address information (identification code information), the program advances from the step 32 to a step 33. When the readout 1-block data represents message information, the program advances from the step 32 to a step 34.

The step 33 decides whether or not the address information (the identification code information) represented by the readout 1-block data substantially agrees with predetermined address information (predetermined identification code information) stored in the ROM within the CPU 24. When the address information (the identification code information) represented by the readout 1-block data does not substantially agree with the predetermined address information (the predetermined identification code information), the program advances from the step 33 to a step 37. When the address information (the identification code information) represented by the readout 1-block data substantially agrees with the predetermined address information (the predetermined identification code information), the program advances from the step 33 to a step 36.

The step 37 deactivates the receiving section 22 for a given time interval (a predetermined time interval) to save electric power. After the step 37, the current execution cycle of the program segment ends.

The step 34 subjects message information in the readout 1-block data to an error correcting process responsive to error correction code information in the readout 1-block data. Thus, the step 34 recovers correction-resultant message information from the readout 1-block data.

A step 35 following the step 34 stores the correction-resultant message information into the RAM within the CPU 24 as a message information piece. After the step 35, the program advances to the step 36.

The step 36 decides whether or not all blocks 123 in a paging signal 121 have been processed. When all blocks 123 in a paging signal 121 have been processed, the program advances from the step 36 to a step 38. Otherwise, the program returns from the step 36 to the step 31.

The step 38 activates the display 25, and transfers all the message information pieces from the RAM within the CPU 24 to the display 25. All the message information pieces compose recovered complete message information. The step 38 controls the display 25 so that the complete message information will be visualized by the display 25. After the step 38, the current execution cycle of the program segment ends.

As understood from the previous description, the CPU 24 does not subject address-representing 1-block data to the error correcting process. This results in a decrease in the number of steps of effective operation of the CPU 24 (that is, a decrease in the activity of the CPU 24). After the address information (the identification code information) represented by the readout 1-block data is found to be substantially different from the predetermined address information (the predetermined identification code information), the CPU 24 deactivates the receiving section 22 for the given time interval to save electric power. Furthermore, in this case, the CPU 24 does not execute steps in FIG. 4 other than the step 37. This results in a decrease in the number of steps of effective operation of the CPU 24 (that is, a decrease in the activity of the CPU 24).

Figure 5:
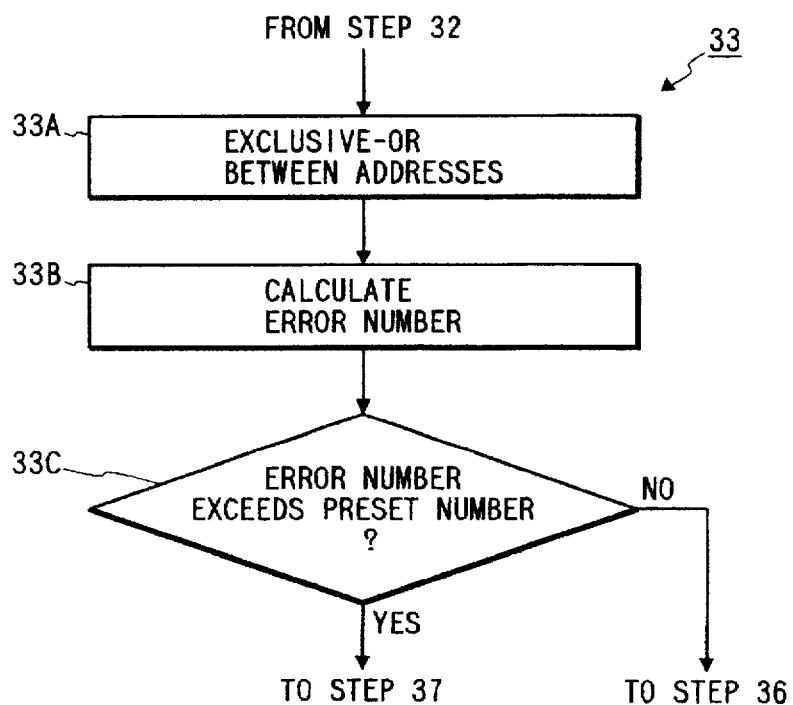
FIG. 5 is a flowchart of a block in FIG 4.

As shown in FIG. 5, the step 33 has sub steps 33A, 33B, and 33C. The first sub step 33A which follows the step 32 of FIG. 4 executes Exclusive-OR operation between the address information (the identification code information) represented by the readout 1-block data and the predetermined address information (the predetermined identification code information). The address information represented by the readout 1-block data has a given number of bits. Also, the predetermined address information has the given number of bits. For example, the given number is equal to 8, 32, or 64. It is now assumed that the given number is equal to 8. The execution of the Exclusive-OR operation results in 8-bit error-pattern data. In the 8-bit error-pattern data, a bit or bits of "0" indicate agreement between logic states of corresponding bits of the address information represented by the readout 1-block data and the predetermined address information, while a bit or bits of "1" indicate disagreement (error) between logic states of corresponding bits of the address information represented by the readout 1-block data and the predetermined address information.

Figures 6, 7:
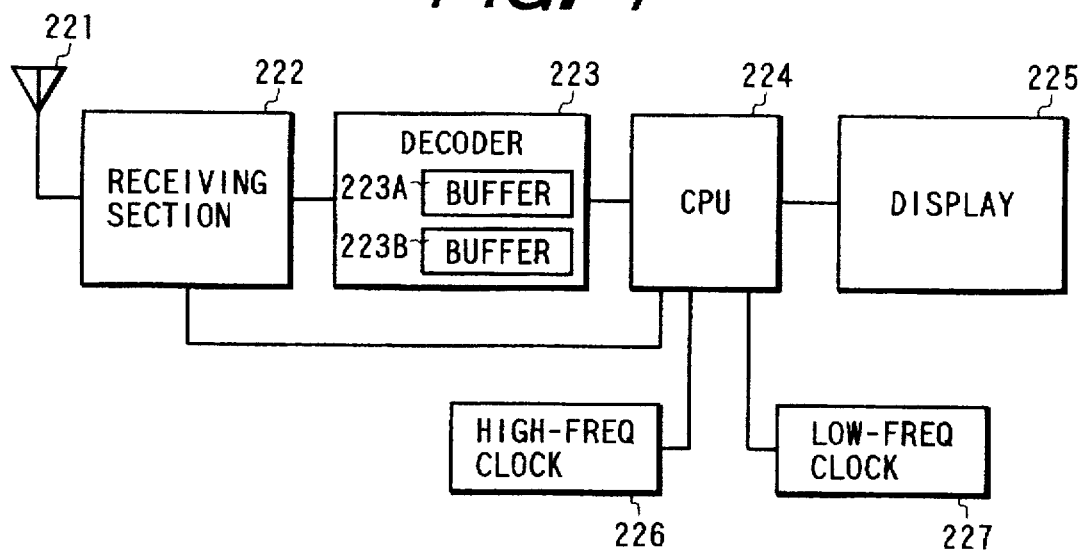
FIG. 6 is a diagram of a conversion table which provides a relation between 8-bit error-pattern data and an error-indicating bit number.
FIG. 7 is a block diagram of a radio message receiver according to a second embodiment of this invention.

The sub step 33B which follows the sub step 33A calculates the number of error-indicating bits of the 8-bit error-pattern data by referring to a conversion table stored in the ROM within the CPU 24. As shown in FIG. 6, the conversion table provides the relation between 8-bit error-pattern data and the error-indicating bit number.

The sub step 33C which follows the sub step 33B compares the error-indicating bit number with a preset number. When the error-indicating bit number is greater than the preset number, the program advances from the sub step 33C to the step 37 of FIG. 4. When the error-indicating bit number is not greater than the preset number, the program advances from the sub step 33C to the step 36 of FIG. 4. The preset number is preferably equal to the given integer "α" which relates to the error correction ability of the error correction code.

Second Embodiment

With reference to FIG. 7, a radio message receiver (a radio paging receiver) includes an antenna 221 followed by a receiving section 222. The antenna 221 serves to catch a radio wave signal transmitted from, for example, a base station. Normally, the radio wave signal includes a paging signal having sync information, address information, and message information. The sync information precedes the address information and the message information. The address information precedes the message information. The address information includes identification code information. A radio wave signal caught by the antenna 221 is fed to the receiving section 222. The receiving section 222 demodulates the radio wave signal into a corresponding baseband signal.

A decoder 223 following the receiving section 222 receives the baseband signal therefrom, and decodes the baseband signal into corresponding data.

The decoder 223 is connected to a CPU 224 having a combination of an I/O port (an interface), a processing section, a RAM, and a ROM. The CPU 224 may be replaced by a microcomputer, a DSP, or another similar device. The CPU 224 receives the data from the decoder 223. The CPU 224 de-interleaves the received data into second data. The CPU 224 recovers identification code information (address information) from the second data. The CPU 224 is connected to a display 225. The CPU 224 is also connected to the receiving section 222. The CPU 224 is of the type, operating in response to an externally-applied clock signal. The CPU 224 is connected to generators 226 and 227 for producing clock signals having a predetermined high frequency and a predetermined low frequency respectively. The frequencies of the two clock signals are equal to, for example, 1.2288 MHz and 76.8 kHz respectively. The CPU 224 operates in accordance with a program stored in the internal ROM.

Normally, the low-frequency clock signal generator 227 is active while the high-frequency clock signal generator 226 is inactive. Thus, normally, the CPU 224 operates in response to the low-frequency clock signal produced by the generator 227, and the activity of the CPU 224 is relatively low. This is advantageous in suppressing the level of radio noise generated by the CPU 224. As will be described later, the CPU 224 activates the high-frequency clock signal generator 226 and deactivates the low-frequency clock signal generator 227 in response to a block sync signal. During a given short time interval thereafter, the high-frequency clock signal generator 226 and the low-frequency clock signal generator 227 remain active and inactive respectively, and the CPU 224 operates in response to the high-frequency clock signal produced by the generator 226 rather than the low-frequency clock signal produced by the generator 227.

Operation of the CPU 224 is changeable between a low-speed mode and a high-speed mode. When the high-frequency clock signal generator 226 and the low-frequency clock signal generator 227 are inactive and actively respectively, the CPU 224 is in the low-speed operation mode. When the high-frequency clock signal generator 226 and the low-frequency clock signal generator 227 are active and inactively respectively, the CPU 224 is in the high-speed operation mode. During operation of the CPU 224 in the low-speed mode, the level of radio noise generated by the CPU 224 is effectively suppressed.

The radio message receiver of FIG. 7 has previously-assigned identification code information (predetermined identification code information or predetermined address information) stored in the ROM within the CPU 224. The predetermined identification code information (the predetermined address information) may be stored in a ROM outside the CPU 224.

According to the program, the CPU 224 de-interleaves the output data of the decoder 223 into the second data. In addition, the CPU 224 recovers the identification code information (the address information) from the second data. Further, the CPU 224 compares the recovered identification code information (the recovered address information) with the predetermined identification code information (the predetermined address information). When the recovered identification code information (the recovered address information) substantially agrees with the predetermined identification code information (the predetermined address information), the CPU 224 recovers message information from the second data. Then, the CPU 224 feeds the recovered message information to the display 225 and controls the display 225 so that the recovered message information will be visualized by the display 225.

When the recovered identification code information (the recovered address information) appreciably disagrees with the predetermined identification code information (the predetermined address information), the CPU 224 does not recover message information from the second data so that the activity of the CPU 224 is prevented from increasing. This is advantageous in suppressing the level of radio noise generated by the CPU 224. In addition, the CPU 224 deactivates the receiving section 222 to save electric power. Furthermore, the CPU 224 holds the display 225 deactivated. Therefore, in this case, any message information is not visualized by the display 225.

As shown in FIG. 2, a head of a paging signal 121 is a sync signal (a bit sync signal) 122 successively followed by blocks 123 having data. The sync signal 122 has a sequence of bits in predetermined logic states corresponding to a given bit pattern (a sync bit pattern). Data in each block 123 is interleaved in unit of "n" words, where "n" denotes a given integer. The total number of the blocks 123 is equal to a given number "j". In general, one or more former blocks 123 represent identification code information (address information) while latter blocks 123 represent message information.

As shown in FIG. 3, one block has a capacity of "m" bits by "n" words, where "m" denotes a given integer. Each word has bits 124 representing main information, and bits 125 representing error correction code information. The main information contains identification code information (address information) or message information. A used error correction code has an error correction ability corresponding to "α" bits, where "α" denotes a given integer. In FIG. 3, the numeral 126 denotes an n-bit data unit subjected to an interleaving process and composed of equal-order-number bits in the respective words. In a base station (a transmitting station), data in one block 123 is divided into "m" data units. The base station sequentially transmits "m" data units for every block 123.

The decoder 223 includes a bit sync section for generating a sampling clock signal from the output signal of the receiving section 222 which corresponds to a bit sync signal 122 in a paging signal 121. The decoder 223 includes a sampling section which periodically samples the output signal of the receiving section 222 in response to the sampling clock signal to decode the output signal of the receiving section 222 into first data bit by bit. The decoder 223 includes a pair of buffer memories 223A and 223B each having a capacity corresponding to one block 123 in a paging signal 121. Portions of the first data which correspond to respective blocks 123 in a paging signal 121 are sequentially and alternately written into the buffer memories 223A and 223B. Generally, one of the buffer memories 223A and 223B in the decoder 223 is subjected to a data writing process while the other buffer memory is accessed by the CPU 224 so that the first data is read out therefrom by the CPU 224.

The decoder 223 also includes a block sync section for generating a block sync signal in response to the sampling clock signal. A pulse in the block sync signal occurs each time the writing of a 1-block portion of the first data into one of the buffer memories 223A and 223B is completed. The decoder 223 outputs the block sync signal to the CPU 224.

The CPU 224 operates in accordance with a program stored in the internal ROM. FIG. 8 is a flowchart of a segment of the program which is executed each time a paging signal 121 is received.

As shown in FIG. 8, a first step 251 of the program segment decides whether or not a pulse in the block sync signal occurs. When a pulse in the block sync signal occurs, the program advances from the step 251 to a step 252. Otherwise, the step 251 is repeated.

The step 252 activates the high-frequency clock signal generator 226 and deactivates the low-frequency clock signal generator 227 so that the CPU 224 enters the high-speed operation mode. A step 253 subsequent to the step 252 reads out 1-block data from one of the buffer memories 223A and 224B in the decoder 223 which is not currently subjected to the data writing process. A step 254 following the step 253 de-interleaves the readout 1-block data into second 1-block data.

A step 255 subsequent to the step 254 decides whether the second 1-block data represents address information (identification code information) or message information. When the second 1-block data represents address information (identification code information), the program advances from the step 255 to a step 256. When the second 1-block data represents message information, the program advances from the step 255 to a step 257.

The step 256 decides whether or not the address information (the identification code information) represented by the second 1-block data substantially agrees with predetermined address information (predetermined identification code information) stored in the ROM within the CPU 224. When the address information (the identification code information) represented by the second 1-block data does not substantially agree with the predetermined address information (the predetermined identification code information), the program advances from the step 256 to a step 260. When the address information (the identification code information) represented by the second 1-block data substantially agrees with the predetermined address information (the predetermined identification code information), the program advances from the step 256 to a step 259. The step 256 is similar to the step 33 in FIGS. 4 and 5.

The step 260 deactivates the receiving section 222 for a given time interval (a predetermined time interval) to save electric power. After the step 260, the program advances to a step 263.

The step 257 subjects message information in the second 1-block data to an error correcting process responsive to error correction code information in the second 1-block data. Thus, the step 257 recovers correction-resultant message information from the second 1-block data.

A step 258 following the step 257 stores the correction-resultant message information into the RAM within the CPU 224 as a message information piece. After the step 258, the program advances to the step 259.

The step 259 decides whether or not all blocks 123 in a paging signal 121 have been processed. When all blocks 123 in a paging signal 121 have been processed, the program advances from the step 259 to a step 261. Otherwise, the program advances from the step 259 to a step 262.

The step 262 deactivates the high-frequency clock signal generator 226 and activates the low-frequency clock signal generator 227 so that the CPU 224 enters the low-speed operation mode. After the step 262, the program returns to the step 251.

The step 261 activates the display 225, and transfers all the message information pieces from the RAM within the CPU 224 to the display 225. All the message information pieces compose recovered complete message information. The step 261 controls the display 225 so that the complete message information will be visualized by the display 225. After the step 261, the program advances to the step 263.

The step 263 deactivates the high-frequency clock signal generator 226 and activates the low-frequency clock signal generator 227 so that the CPU 224 enters the low-speed operation mode. After the step 263, the current execution cycle of the program segment ends.

Third Embodiment

Figure 9:
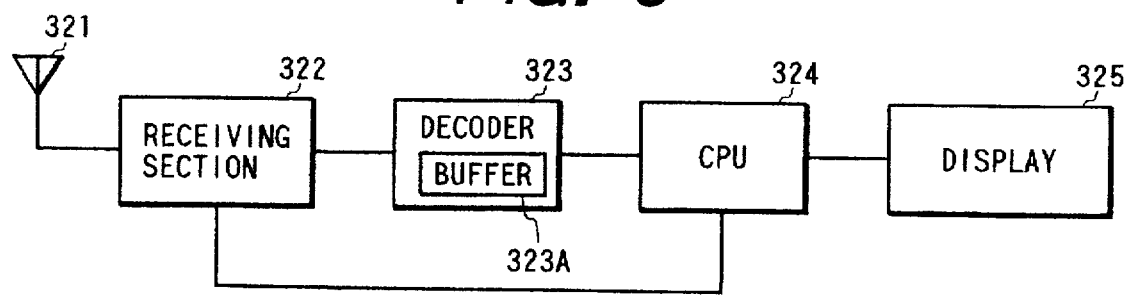
FIG. 9 is a block diagram of a radio message receiver according to a third embodiment of this invention.

With reference to FIG. 9, a radio message receiver (a radio paging receiver) includes an antenna 321 followed by a receiving section 322. The antenna 321 serves to catch a radio wave signal transmitted from, for example, a base station. Normally, the radio wave signal includes a paging signal having a sequence of a bit sync signal and an information signal. The bit sync signal has a sequence of bits in predetermined logic states corresponding to a given bit pattern (a sync bit pattern). The information signal represents address information and message information. The address information precedes the message information. The address information includes identification code information. A radio wave signal caught by the antenna 321 is fed to the receiving section 322. The receiving section 322 demodulates the radio wave signal into a corresponding baseband signal.

A decoder 323 following the receiving section 322 receives the baseband signal therefrom, and decodes the baseband signal into corresponding data.

The decoder 323 is connected to a CPU 324 having a combination of an I/O port (an interface), a processing section, a RAM, and a ROM. The CPU 324 may be replaced by a microcomputer, a DSP, or another similar device. The CPU 324 receives the data generated by the decoder 323. The CPU 324 detects or calculates a bit error rate by referring to a portion of the data generated by the decoder 323 which corresponds to a bit sync signal. The CPU 324 processes the remainder of the data generated by the decoder 323. The CPU 324 changes the way of data processing between two different types in response to the detected bit error rate. Basically, the CPU 324 de-interleaves the received data into second data. The CPU 324 recovers identification code information (address information) from the second data. The CPU 324 is connected to a display 325. The CPU 324 is also connected to the receiving section 322. The CPU 324 operates in accordance with a program stored in the internal ROM.

The radio message receiver of FIG. 9 has previously-assigned identification code information (predetermined identification code information or predetermined address information) stored in the ROM within the CPU 324. The predetermined identification code information (the predetermined address information) may be stored in a ROM outside the CPU 324.

According to the program, the CPU 324 de-interleaves the output data of the decoder 323 into the second data. In addition, the CPU 324 recovers the identification code information (the address information) from the second data. Further, the CPU 324 compares the recovered identification code information (the recovered address information) with the predetermined identification code information (the predetermined address information). When the recovered identification code information (the recovered address information) substantially agrees with the predetermined identification code information (the predetermined address information), the CPU 324 recovers message information from the second data. Then, the CPU 324 feeds the recovered message information to the display 325 and controls the display 325 so that the recovered message information will be visualized by the display 325.

When the recovered identification code information (the recovered address information) appreciably disagrees with the predetermined identification code information (the predetermined address information), the CPU 324 does not recover message information from the second data so that the activity of the CPU 324 is prevented from increasing. This is advantageous in suppressing the level of radio noise generated by the CPU 324. In addition, normally, the CPU 324 deactivates the receiving section 322 to save electric power. Furthermore, the CPU 324 holds the display 325 deactivated. Therefore, in this case, any message information is not visualized by the display 325.

As shown in FIG. 2, a head of a paging signal 121 is a sync signal (a bit sync signal) 122 successively followed by blocks 123 having data. The sync signal 122 has a sequence of bits in predetermined logic states corresponding to a given bit pattern (a sync bit pattern). Data in each block 123 is interleaved in unit of "n" words, where "n" denotes a given integer. The total number of the blocks 123 is equal to a given number "j". In general, one or more former blocks 123 represent identification code information (address information) while latter blocks 123 represent message information.

As shown in FIG. 3, one block has a capacity of "m" bits by "n" words, where "m" denotes a given integer. Each word has bits 124 representing main information, and bits 125 representing error correction code information. The main information contains identification code information (address information) or message information. A used error correction code has an error correction ability corresponding to "α" bits, where "α" denotes a given integer. In FIG. 3, the numeral 126 denotes an n-bit data unit subjected to an interleaving process and composed of equal-order-number bits in the respective words. In a base station (a transmitting station), data in one block 123 is divided into "m" data units. The base station sequentially transmits "m" data units for every block 123.

The decoder 323 includes a bit sync section for generating a sampling clock signal from the output signal of the receiving section 322 which corresponds to a former part of a bit sync signal 122 in a paging signal 121. The decoder 323 includes a sampling section which periodically samples the output signal of the receiving section 322 in response to the sampling clock signal to decode the output signal of the receiving section 322 into first data bit by bit. The decoder 323 feeds the CPU 324 with a former portion of the first data which corresponds to a latter part of the bit sync signal 122 in the paging signal 121. Thus, the former portion of the first data is bit sync data. The decoder 323 includes a large-capacity buffer memory 323A. Portions of the first data which correspond to respective blocks 123 in the paging signal 121 are sequentially written into different areas of the buffer memory 323A respectively. The buffer memory 323A can be accessed by the CPU 324 so that the first data can be read out therefrom by the CPU 324.

Figure 10:
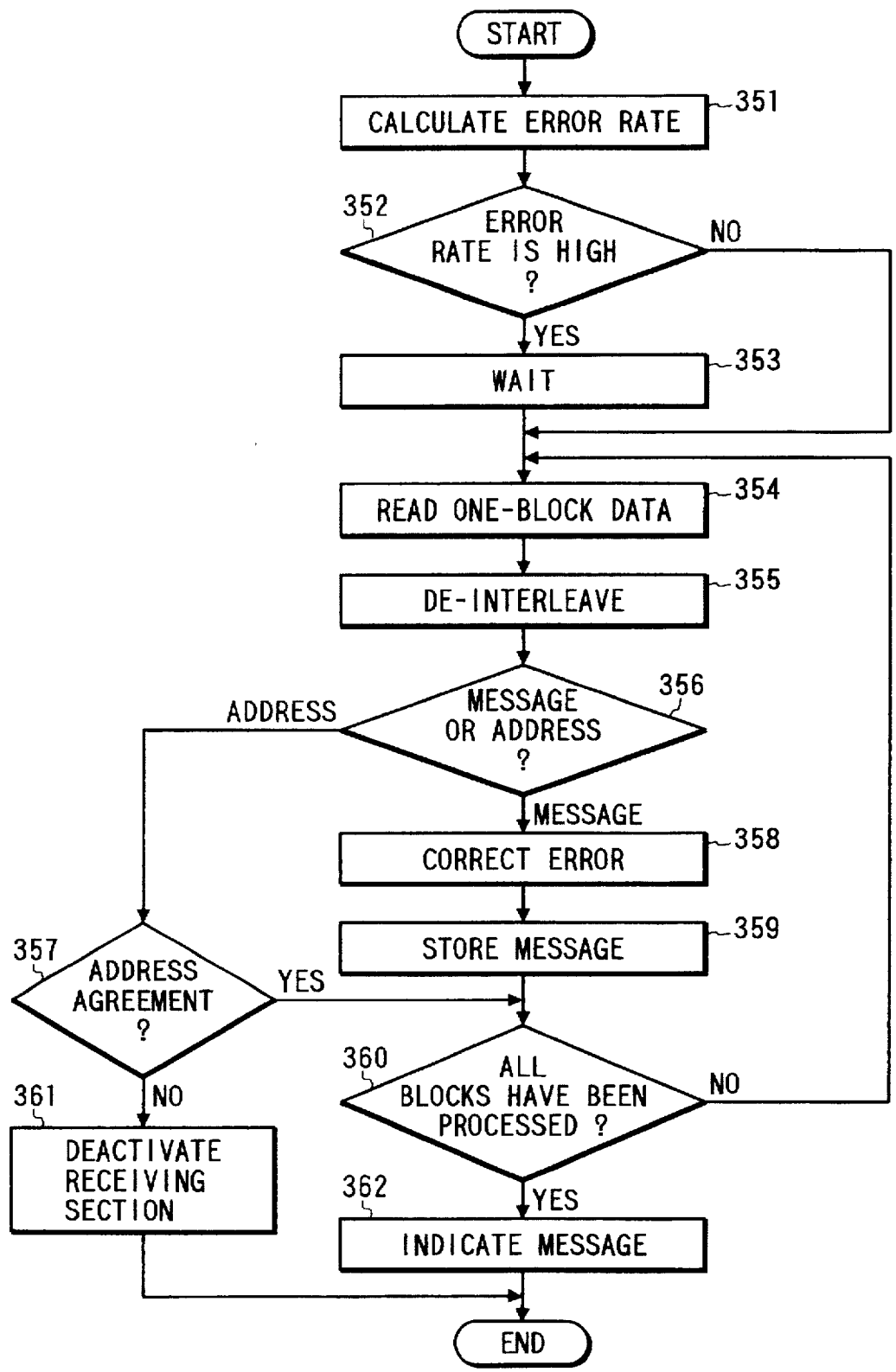
FIG. 10 is a flowchart of a segment of a program for controlling a CPU in FIG. 9.

The CPU 324 operates in accordance with a program stored in the internal ROM. FIG. 10 is a flowchart of a segment of the program which is executed each time a paging signal 121 is received.

As shown in FIG. 10, a first step 351 calculates a bit error rate by referring to the bit sync data outputted from the decoder 323. Specifically, the step 351 compares the bit sync data and preset reference data bit by bit. The preset reference data has a given bit pattern corresponding to normal bit sync data. A bit in the bit sync data, which is equal in logic state to a corresponding bit in the preset reference data, is regarded as a correct bit. A bit in the bit sync data, which is different in logic state from a corresponding bit in the preset reference data, is regarded as an error bit. The step 351 counts every error bit to determine the number of error bits. The step 351 calculates a bit error rate from a ratio between the error bit number and a total bit number.

A step 352 following the step 351 decides whether or not the calculated bit error rate is higher than a predetermined reference rate. When the calculated bit error rate is higher than the predetermined reference rate, the program advances from the step 352 to a step 353. Otherwise, the program jumps from the step 352 to a step 354.

The step 353 waits a given time interval in which the writing of all the first data into the buffer memory 323A within the decoder 323 is completed. After the step 353, the program advances to the step 354.

The execution of the waiting step 353 provides a low activity of the CPU 324. This is advantageous in suppressing the level of radio noise generated by the CPU 324. Accordingly, in the case where the calculated bit error rate is higher than the predetermined reference rate, the CPU 324 less adversely affects the operation of the receiving section 322 and the operation of the decoder 323 during the writing of all the first data into the buffer memory 323A within the decoder 323.

The step 354 reads out 1-block data from the buffer memory 323A in the decoder 323. The readout 1-block data changes from one to the next one for every execution of the step 354. A step 355 following the step 354 de-interleaves the readout 1-block data into second 1-block data.

A step 356 subsequent to the step 355 decides whether the second 1-block data represents address information (identification code information) or message information. When the second 1-block data represents address information (identification code information), the program advances from the step 356 to a step 357. When the second 1-block data represents message information, the program advances from the step 356 to a step 358.

The step 357 decides whether or not the address information (the identification code information) represented by the second 1-block data substantially agrees with predetermined address information (predetermined identification code information) stored in the ROM within the CPU 324. When the address information (the identification code information) represented by the second 1-block data does not substantially agree with the predetermined address information (the predetermined identification code information), the program advances from the step 357 to a step 361. When the address information (the identification code information) represented by the second 1-block data substantially agrees with the predetermined address information (the predetermined identification code information), the program advances from the step 357 to a step 360. The step 357 is similar to the step 33 in FIGS. 4 and 5.

The step 361 deactivates the receiving section 322 for a given time interval (a predetermined time interval) to save electric power. After the step 361, the current execution cycle of the program segment ends.

The step 358 subjects message information in the second 1block data to an error correcting process responsive to error correction code information in the second 1-block data. Thus, the step 358 recovers correction-resultant message information from the second 1-block data.

A step 359 following the step 358 stores the correction-resultant message information into the RAM within the CPU 324 as a message information piece. After the step 359, the program advances to the step 360.

The step 360 decides whether or not all blocks 123 in a paging signal 121 have been processed. When all blocks 123 in a paging signal 121 have been processed, the program advances from the step 360 to a step 362. Otherwise, the program returns from the step 360 to the step 354.

The step 362 activates the display 325, and transfers all the message information pieces from the RAM within the CPU 324 to the display 325. All the message information pieces compose recovered complete message information. The step 362 controls the display 325 so that the complete message information will be visualized by the display 325. After the step 362, the current execution cycle of the program segment ends.

In the case where the calculated bit error rate is not higher than the predetermined reference rate, the program directly advances from the step 352 to the step 354. Thus, in this case, 1-block data is transferred from the buffer memory 323A within the decoder 323 to the CPU 324 and is then processed thereby while the first data continues to be written into the buffer memory 323A within the decoder 323. Accordingly, the processing of 1-block data by the CPU 324 and the writing of the first data into the buffer memory 323A are simultaneously executed. This is advantageous in quickly recovering complete message information.

Fourth Embodiment

A fourth embodiment of this invention will now be briefly described. According to the fourth embodiment, a radio paging signal is demodulated into a baseband signal, and the baseband signal is decoded into corresponding data (decoding-resultant data). Address information is recovered from the decoding-resultant data. Message information is recovered from the decoding-resultant data. The recovered message information is subjected to an error correction process. The recovered address information is prevented from undergoing the error correction process.

Figure 11:
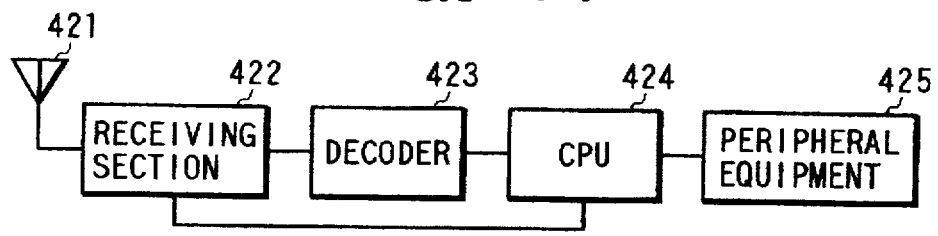
FIG. 11 is a block diagram of a radio message receiver according to a fourth embodiment of this invention.

The fourth embodiment will now be described in detail. With reference to FIG. 11, a radio message receiver (a radio paging receiver) includes an antenna 421 followed by a receiving section 422. The antenna 421 serves to catch a radio wave signal transmitted from, for example, a base station. Normally, the radio wave signal includes a paging signal having sync information, address information, and message information. The sync information precedes the address information and the message information. The address information precedes the message information. The address information includes identification code information. A radio wave signal caught by the antenna 421 is fed to the receiving section 422. The receiving section 422 demodulates the radio wave signal into a corresponding baseband signal.

A decoder 423 following the receiving section 422 receives the baseband signal therefrom, and decodes the baseband signal into corresponding data.

The decoder 423 is connected to a CPU 424 having a combination of an I/O port (an interface), a processing section, a RAM, and a ROM. The CPU 424 may be replaced by a microcomputer, a DSP, or another similar device. The CPU 424 receives the data from the decoder 423. The CPU 424 recovers identification code information (address information) from the received data. The CPU 424 is connected to peripheral equipments 25 including a display and a sound generator. The sound generator uses, for example, a loudspeaker. The CPU 424 is also connected to the receiving section 422. The CPU 424 operates in accordance with a program stored in the internal ROM. Also, the ROM within the CPU 424 stores information representing code words to which error correcting check bits are added.

Figure 12:
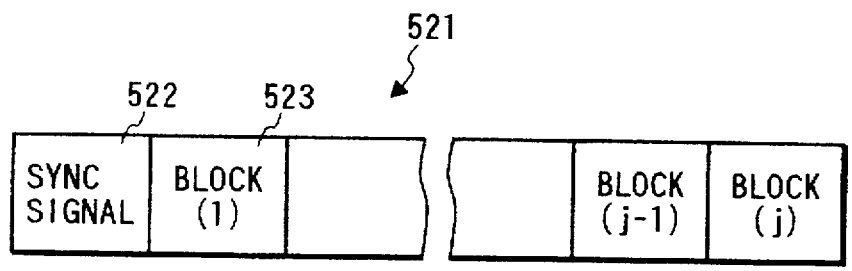
FIG. 12 is a diagram of a format of a paging signal.

FIG. 12 shows a format of a paging signal 521. A head of the paging signal 521 is a sync signal (a bit sync signal) 522 successively followed by blocks 523 having data. The sync signal 522 has a sequence of bits in predetermined logic states corresponding to a given bit pattern (a sync bit pattern). Data in each block 523 is interleaved in unit of "n" words, where "n" denotes a given integer. The total number of the blocks 523 is equal to a given number "j". In general, one or more former blocks 523 represent identification code information (address information) while latter blocks 523 represent message information.

Figure 13:
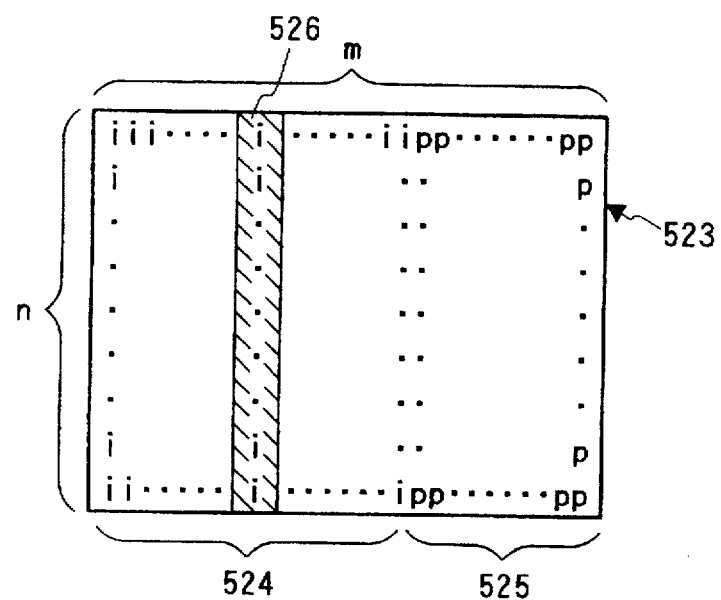
FIG. 13 is a diagram of a two-dimensional expression of data in one block.

FIG. 13 shows a two-dimensional expression of data in one block 523. As shown in FIG. 13, one block has a capacity of "m" bits by "n" words, where "m" denotes a given integer. Each word has a fixed length equal to "m" bits. Each word has bits 524 representing main information, and bits 525 representing error correction code information. The main information contains identification code information (address information) or message information. A used error correction code has an error correction ability corresponding to "α" bits, where "α" denotes a given integer. In FIG. 13, the numeral 526 denotes an n-bit data unit subjected to an interleaving process and composed of equal-order-number bits in the respective words. In a base station (a transmitting station), data in one block 523 is divided into "m" data units. The base station sequentially transmits "m" data units for every block 523.

The decoder 423 includes a bit sync section for generating a sampling clock signal from the output signal of the receiving section 422 which corresponds to a bit sync signal 522 in a paging signal 521. The decoder 423 includes a sampling section which periodically samples the output signal of the receiving section 422 in response to the sampling clock signal to decode the output signal of the receiving section 422 into first data bit by bit. The decoder 423 includes a de-interleaving section for de-interleaving the first data into second data. The decoder 423 includes a pair of buffer memories each having a capacity corresponding to one block 523 in a paging signal 521. Portions of the second data which correspond to respective blocks 523 in a paging signal 521 are sequentially and alternately written into the buffer memories.

Generally, one of the buffer memories in the decoder 423 is subjected to a data writing process while the other buffer memory is accessed by the CPU 424 so that data (the second data) is read out therefrom by the CPU 424. When the writing into each of the buffer memories in the decoder 423 reaches a given value, the decoder 423 outputs a specified signal to the CPU 424. Here, the given value corresponds to one block.

The CPU 424 operates in accordance with a program stored in the internal ROM. A unit of processing by the CPU 424 is one code word ("m" bits) in one block. When the CPU 424 receives an address assigned to the related radio message receiver, the CPU 424 recognizes a position and a size of a message directed to the related radio message receiver. The CPU 424 recognizes the number of code words in one block.

Figure 14:
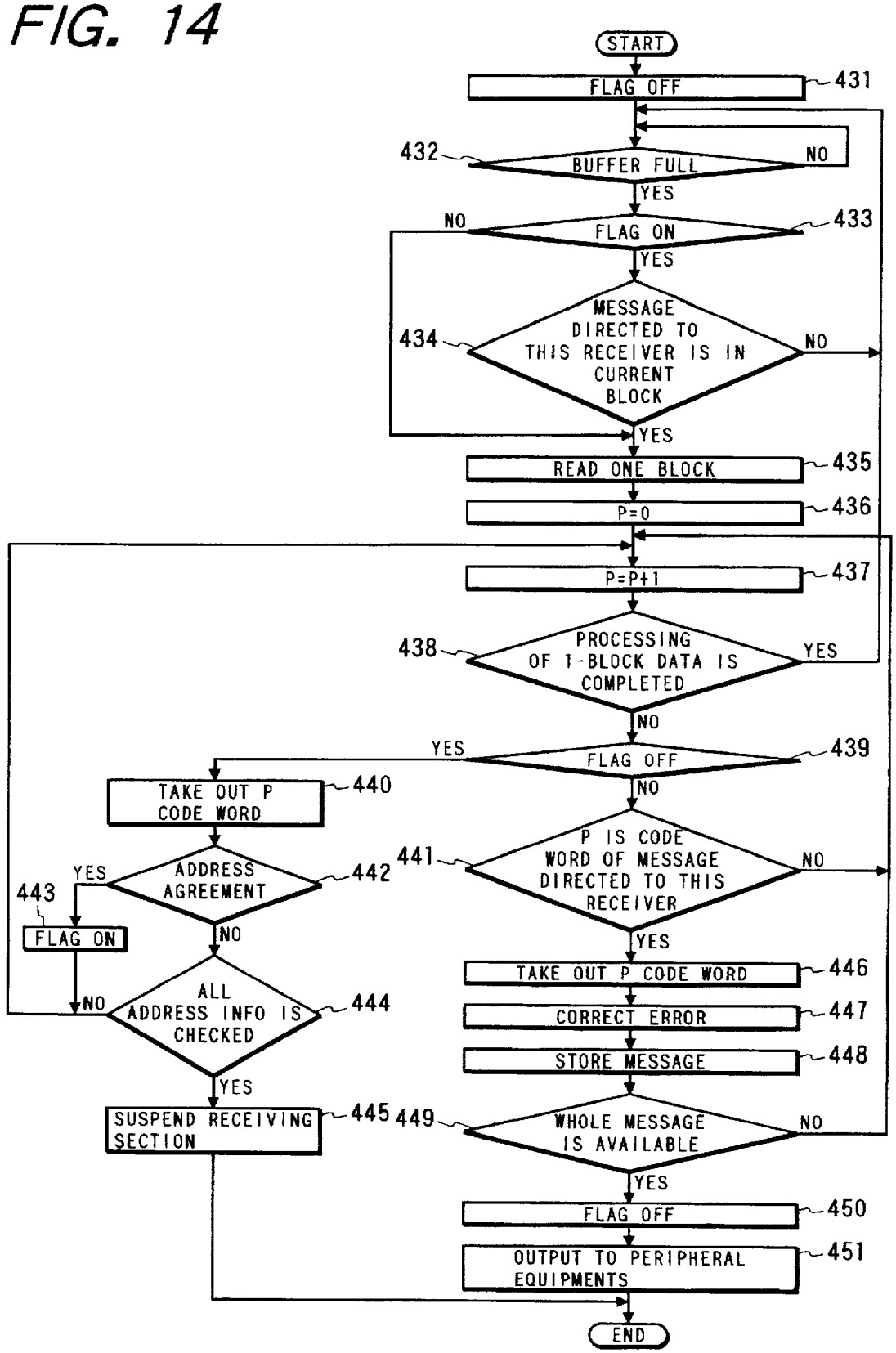
FIG. 14 is a flowchart of a segment of a program for controlling a CPU in FIG. 11.

FIG. 14 is a flowchart of a segment of the program which is executed each time a paging signal 521 is received. As shown in FIG. 14, a first step 431 of the program segment sets a message reception flag to off. The message reception flag will be simply referred to as the flag. After the step 431, the program advances to a step 432. The step 432 decides whether or not the buffer is full. When the buffer is full, the program advances to a step 433. Otherwise, the step 432 is repeated.

The step 433 decides whether or not the flag is on. When the flag is on, the program advances from the step 433 to a step 434. Otherwise, the program advances from the step 433 to a step 435. The step 434 decides whether or not a message directed to the related radio message receiver is in the current block. When a message directed to the related radio message receiver is in the current block, the program advances from the step 434 to the step 435. Otherwise, the program returns from the step 434 to the step 432.

The step 435 reads one block. A step 436 following the step 435 sets a variable P to "0". The variable P represents a code word order number. After the step 436, the program advances to a step 437. The step 437 increments the number P by "1". A step 438 subsequent to the step 437 decides whether or not the processing of 1-block data is completed. When the processing of 1-block data is completed, the program returns from the step 438 to the step 432. Otherwise, the program advances from the step 438 to a step 439.

The step 439 decides whether or not the flag is off. When the flag is off, the program advances from the step 439 to a step 440. Otherwise, the program advances from the step 439 to a step 441.

The step 440 takes out a code word having an order number equal to the number P. A step 442 decides whether or not addresses agree with each other. When the addresses agree with each other, the program advances from the step 442 to a step 443. Otherwise, the program advances from the step 442 to a step 444. The step 443 sets the flag to on. After the step 443, the program returns to the step 437.

The step 444 decides whether or not all the address information has been checked. When all the address information has been checked, the program advances from the step 444 to a step 445. Otherwise, the program returns from the step 444 to the step 437. The step 445 suspends the operation of the receiving section. After the step 445, the current execution cycle of the program segment ends.

The step 441 decides whether or not the number P corresponds to a code word of a message directed to the related radio message receiver. When the number P corresponds to a code word of a message directed to the related radio message receiver, the program advances from the step 441 to a step 446. Otherwise, the program returns from the step 441 to the step 437.

The step 446 takes out a code word having an order number equal to the number P. A step 447 following the step 446 executes error correction. A step 448 subsequent to the step 447 stores the message. A step 449 following the step 448 decides whether or the whole of the message directed to the related radio message receiver is available. When the whole of the message directed to the related radio message receiver is available, the program advances from the step 449 to a step 450. Otherwise, the program returns from the step 449 to the step 437.

The step 450 sets the flag to off. A step 451 following the step 450 outputs signals to the peripheral equipments. After the step 451, the current execution cycle of the program segment ends.

As understood from the previous description, the CPU 424 does not subject address-representing 1-block data to the error correcting process. This results in a decrease in the number of steps of effective operation of the CPU 424 (that is, a decrease in the activity of the CPU 424). After the address information (the identification code information) represented by the readout 1-block data is found to be substantially different from the predetermined address information (the predetermined identification code information), the CPU 424 deactivates the receiving section 422 for the given time interval to save electric power. Furthermore, in this case, the CPU 424 does not execute steps in FIG. 14 other than the step 445. This results in a decrease in the number of steps of effective operation of the CPU 424 (that is, a decrease in the activity of the CPU 424).

The address information (the code word) related to the radio message receiver is stored in the ROM within the CPU 424. The address information in the ROM within the CPU 424 is one code word, and has "m" bits generally equal to 32 bits. The address information (the code word) in the ROM within the CPU 424 is divided into four "8"-bit segments "A", "B", "C", and "D". The received m-bit code word representing the address information is also divided into four 8-bit segments "A", "B", "C", and "D".

Figure 15:
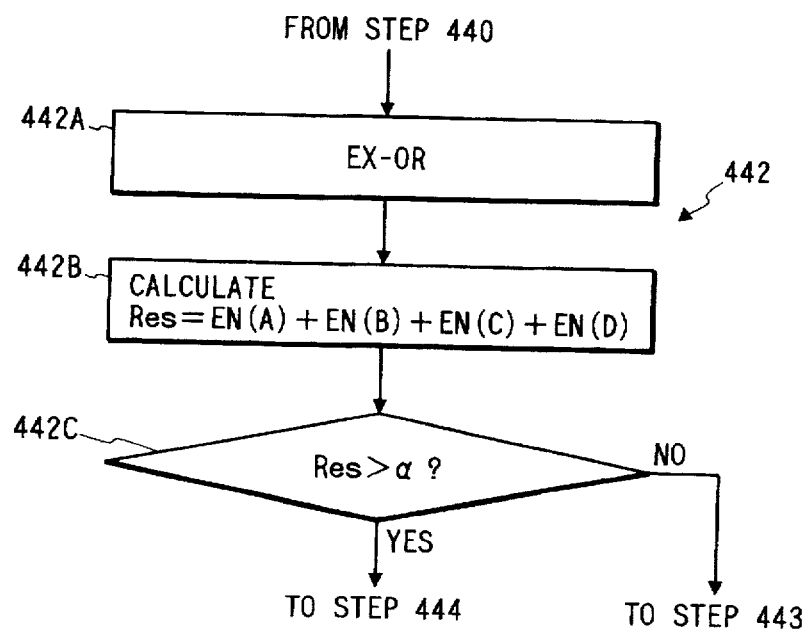
FIG. 15 is a flowchart of a block in FIG. 14.

As shown in FIG. 15, the step 442 has sub steps 442A, 442B, and 442C. The first sub step 442A which follows the step 440 of FIG. 14 executes Exclusive-OR operation between the received address information and the address information of the related radio message receiver for each of the 8-bit segments "A", "B", "C", and "D". The execution of the Exclusive-OR operation results in 8-bit error-pattern data for each of the 8-bit segments "A", "B", "C", and "D". In each 8-bit error-pattern data, a bit or bits of "0" indicate agreement between logic states of corresponding bits of the received address information and the address information of the related radio message receiver while a bit or bits of "1" indicate disagreement (error) between logic states of corresponding bits of the received address information and the address information of the related radio message receiver.

Figures 16, 17:
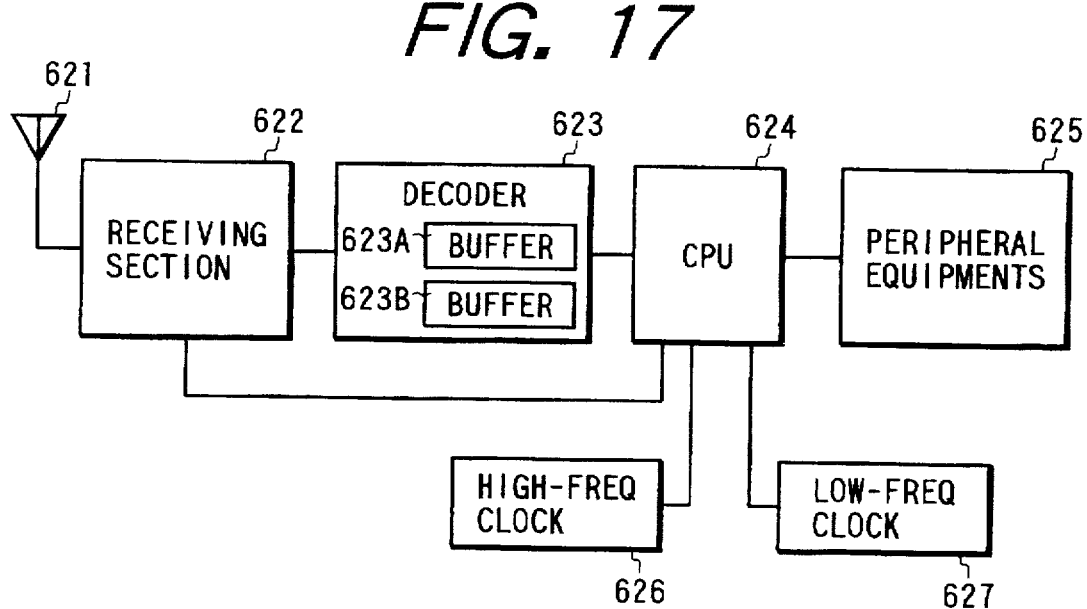
FIG. 16 is a diagram of a conversion table which provides a relation between 8-bit error-pattern data and an error-indicating bit number.
FIG. 17 is a block diagram of a radio message receiver according to a fifth embodiment of this invention.

The sub step 442B which follows the sub step 442A calculates the number of error-indicating bits of each 8-bit error-pattern data by referring to a conversion table stored in the ROM within the CPU 424. As shown in FIG. 16, the conversion table provides the relation between 8-bit error-pattern data X and the error-indicating bit number EN(X).

Thus, the step 442B calculates the error-indicating bit number EN(A), the error-indicating bit number EN(B), the error-indicating bit number EN(C), and the error-indicating bit number EN(D) which correspond to the 8-bit segments "A", "B", "C", and "D" respectively. Then, the step 442B calculates the sum Res of the error-indicating bit number EN(A), the error-indicating bit number EN(B), the error-indicating bit number EN(C), and the error-indicating bit number EN(D).

The sub step 442C which follows the sub step 442B compares the sum Res with the error correction ability bit number "α". When the sum Res is greater than the error correction ability bit number "α", the program advances from the sub step 442C to the step 444 of FIG. 14. Otherwise, the program advances from the sub step 442C to the step 443 of FIG. 14.

Fifth Embodiment

A fifth embodiment of this invention will now be briefly described. According to the fifth embodiment, a radio paging signal is demodulated into a baseband signal, and the baseband signal is decoded into corresponding data. A CPU alternately executes processing of the data and another job. First and second clock signals have first and second predetermined frequencies respectively. The first predetermined frequency is higher than the second predetermined frequency. The CPU operates in response to the first clock signal when the CPU executes the processing of the data. The CPU operates in response to the second clock signal when the CPU executes the other job. There is provided a clock generator generating a frequency at which the CPU has a speed of data processing of "m"×"n" bits during a time for which a receiving section receives "n"×"α" bits in the case where an error correction ability in the CPU is "α" bits when data interleaved in unit of "m" bits/word×"n" words.

With reference to FIG. 17, a radio message receiver (a radio paging receiver) includes an antenna 621 followed by a receiving section 622. The antenna 621 serves to catch a radio wave signal transmitted from, for example, a base station. Normally, the radio wave signal includes a paging signal having sync information, address information, and message information. The sync information precedes the address information and the message information. The address information precedes the message information. The address information includes identification code information. A radio wave signal caught by the antenna 621 is fed to the receiving section 622. The receiving section 622 demodulates the radio wave signal into a corresponding baseband signal.

A decoder 623 following the receiving section 622 receives the baseband signal therefrom, and decodes the baseband signal into corresponding data.

The decoder 623 is connected to a CPU 624 having a combination of an I/O port (an interface), a processing section, a RAM, and a ROM. The CPU 624 may be replaced by a microcomputer, a DSP, or another similar device. The CPU 624 receives the data from the decoder 623. The CPU 624 de-interleaves the received data into second data. The CPU 624 recovers identification code information (address information) from the second data. The CPU 624 is connected to peripheral equipments 625 including a display and a sound generator. The sound generator uses, for example, a loudspeaker. The CPU 624 is also connected to the receiving section 622. The CPU 624 is of the type, operating in response to an externally-applied clock signal. The CPU 624 is connected to generators 626 and 627 for producing clock signals having a predetermined high frequency and a predetermined low frequency respectively. The frequencies of the two clock signals are equal to, for example, 1.2288 MHz and 76.8 kHz respectively. The CPU 624 operates in accordance with a program stored in the internal ROM.

Normally, the low-frequency clock signal generator 627 is active while the high-frequency clock signal generator 626 is inactive. Thus, normally, the CPU 624 operates in response to the low-frequency clock signal produced by the generator 627, and the activity of the CPU 624 is relatively low. This is advantageous in suppressing the level of radio noise generated by the CPU 624. As will be described later, the CPU 624 activates the high-frequency clock signal generator 626 and deactivates the low-frequency clock signal generator 627 in response to a block sync signal. During a given short time interval thereafter, the high-frequency clock signal generator 626 and the low-frequency clock signal generator 627 remain active and inactive respectively, and the CPU 624 operates in response to the high-frequency clock signal produced by the generator 626 rather than the low-frequency clock signal produced by the generator 627.

Operation of the CPU 624 is changeable between a low-speed mode and a high-speed mode. When the high-frequency clock signal generator 626 and the low-frequency clock signal generator 627 are inactive and actively respectively, the CPU 624 is in the low-speed operation mode. When the high-frequency clock signal generator 626 and the low-frequency clock signal generator 627 are active and inactively respectively, the CPU 624 is in the high-speed operation mode. During operation of the CPU 624 in the low-speed mode, the level of radio noise generated by the CPU 624 is effectively suppressed.

As shown in FIG. 12, a head of a paging signal 521 is a sync signal (a bit sync signal) 522 successively followed by blocks 523 having data. The sync signal 522 has a sequence of bits in predetermined logic states corresponding to a given bit pattern (a sync bit pattern). Data in each block 523 is interleaved in unit of "n" words, where "n" denotes a given integer. The total number of the blocks 523 is equal to a given number "j". In general, one or more former blocks 523 represent identification code information (address information) while latter blocks 523 represent message information.

As shown in FIG. 13, one block has a capacity of "m" bits by "n" words, where "m" denotes a given integer. Each word has a fixed length equal to "m" bits. Each word has bits 524 representing main information, and bits 525 representing error correction code information. The main information contains identification code information (address information) or message information. A used error correction code has an error correction ability corresponding to "α", where "α" denotes a given integer. In FIG. 13, the numeral 526 denotes an n-bit data unit subjected to an interleaving process and composed of equal-order-number bits in the respective words. In a base station (a transmitting station), data in one block 523 is divided into "m" data units. The base station sequentially transmit "m" data units for every block 523.

The decoder 623 includes a bit sync section for generating a sampling clock signal from the output signal of the receiving section 622 which corresponds to a bit sync signal 522 in a paging signal 521. The decoder 623 includes a sampling section which periodically samples the output signal of the receiving section 622 in response to the sampling clock signal to decode the output signal of the receiving section 622 into first data bit by bit. The decoder 623 includes a pair of buffer memories 623A and 623B each having a capacity corresponding to one block 523 in a paging signal 521. Portions of the first data which correspond to respective blocks 523 in a paging signal 521 are sequentially and alternately written into the buffer memories 623A and 623B. Generally, one of the buffer memories 623A and 623B in the decoder 223 is subjected to a data writing process while the other buffer memory is accessed by the CPU 624 so that the first data is read out therefrom by the CPU 624.

The decoder 623 also includes a block sync section for generating a block sync signal in response to the sampling clock signal. A pulse in the block sync signal occurs each time the writing of a 1-block portion of the first data into one of the buffer memories 623A and 623B is completed. The decoder 623 outputs the block sync signal to the CPU 624. In this way, when the writing into each of the buffer memories 623A and 623B in the decoder 623 reaches a given value, the decoder 623 outputs a specified signal to the CPU 624. Here, the given value corresponds to "n" bits.

The CPU 624 operates in accordance with a program stored in the internal ROM. A unit of processing by the CPU 624 is one code word ("m" bits) in one block. When the CPU 624 receives an address assigned to the related radio message receiver, the CPU 624 recognizes a position and a size of a message directed to the related radio message receiver. The CPU 624 recognizes the number of code words in one block.

Figure 18:
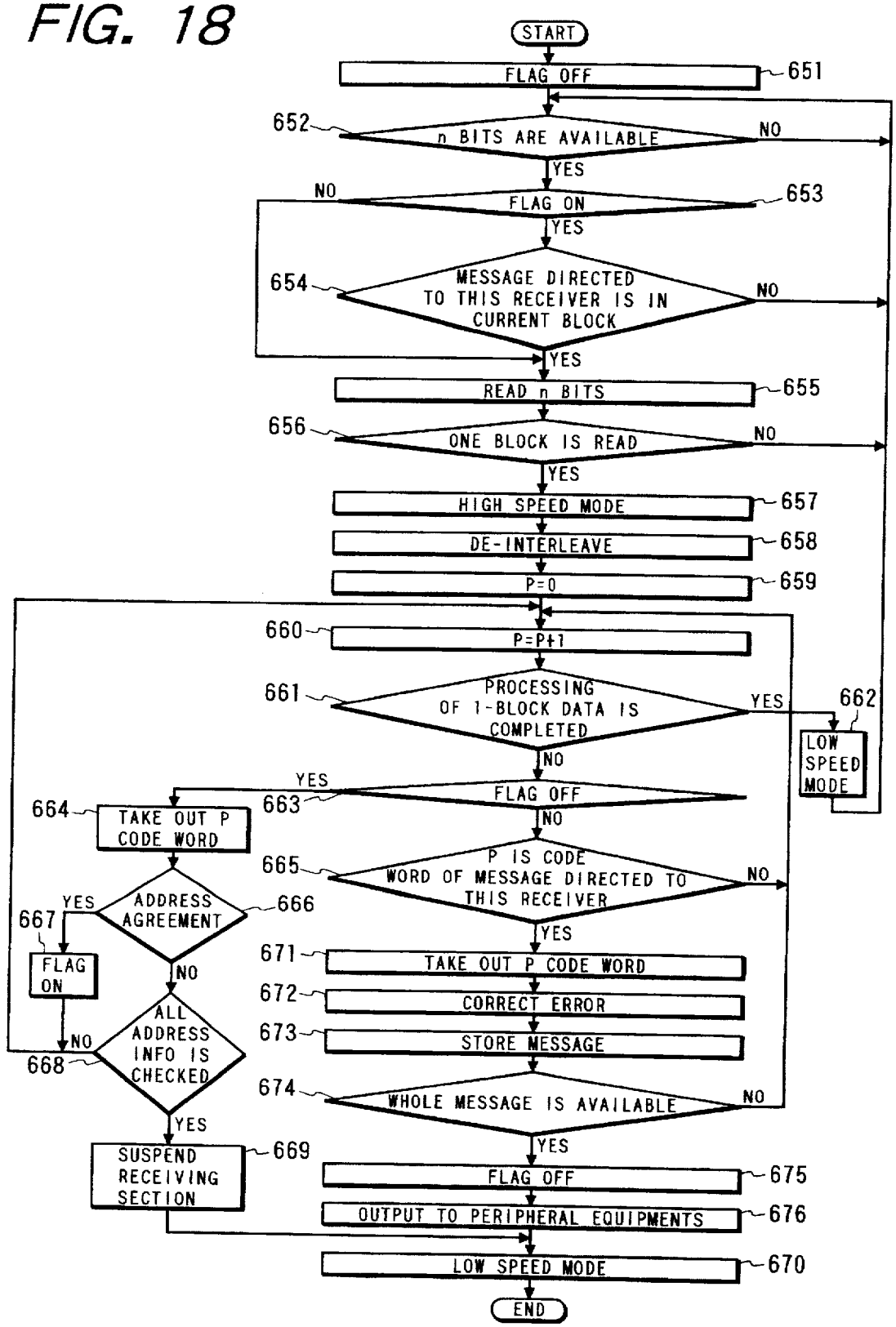
FIG. 18 is a flowchart of a segment of a program for controlling a CPU in FIG. 17.

FIG. 18 is a flowchart of a segment of the program which is executed each time a paging signal 521 is received. As shown in FIG. 18, a first step 651 of the program segment makes off a message reception flag. The message reception flag will be simply referred to as the flag. After the step 651, the program advances to a step 652. The step 652 decides whether or not the "n" bits are available. When the "n" bits are available, the program advances from the step 652 to a step 653. Otherwise, the step 652 is repeated.

The step 653 decides whether or not the flag is on. When the flag is on, the program advances from the step 653 to a step 654. Otherwise, the program advances from the step 653 to a step 655. The step 654 decides whether or not a message directed to the related radio message receiver is in the current block. When a message directed to the related radio message receiver is in the current block, the program advances from the step 654 to the step 655. Otherwise, the program returns from the step 654 to the step 652.

The step 655 reads the "n" bits. A step 656 following the step 655 decides whether or not one block has been read. When one block has been read, the program advances from the step 656 to a step 657. Otherwise, the program returns from the step 656 to the step 652.

The step 657 puts the CPU 624 into a high-speed operation mode. A step 658 following the step 657 executes a de-interleaving process. A step 659 subsequent to the step 658 sets a variable P to "0". The variable P represents a code word order number. After the step 659, the program advances to a step 660. The step 660 increments the number P by "1". A step 661 subsequent to the step 660 decides whether or not the processing of 1-block data is completed. When the processing of 1-block data is completed, the program advances from the step 661 to a step 662. Otherwise, the program advances from the step 661 to a step 663.

The step 662 puts the CPU 624 into a low-speed operation mode. After the step 662, the program returns to the step 652. The step 663 decides whether or not the flag is off.

When the flag is off, the program advances from the step 663 to a step 664. Otherwise, the program advances from the step 663 to a step 665.

The step 664 takes out a code word having an order number equal to the number P. A step 666 following the step 664 decides whether or not addresses agree with each other. When the addresses agree with each other, the program advances from the step 666 to a step 667. Otherwise, the program advances from the step 666 to a step 668. The step 666 is similar to the step 442 in FIGS. 14 and 15. The step 667 makes the flag on. After the step 667, the program returns to the step 660.

The step 668 decides whether or not all the address information has been checked. When all the address information has been checked, the program advances from the step 668 to a step 669. Otherwise, the program returns from the step 668 to the step 660. The step 669 suspends the operation of the receiving section. After the step 669, the program advances to a step 670. The step 670 puts the CPU 624 into the low-speed operation mode. After the step 670, the current execution cycle of the program segment ends.

The step 665 decides whether or not the number P corresponds to a code word of a message directed to the related radio message receiver. When the number P corresponds to a code word of a message directed to the related radio message receiver, the program advances from the step 665 to a step 671. Otherwise, the program returns from the step 665 to the step 660.

The step 671 takes out a code word having an order number equal to the number P. A step 672 following the step 671 executes error correction. A step 673 subsequent to the step 672 stores the message. A step 674 following the step 673 decides whether or the whole of the message directed to the related radio message receiver is available. When the whole of the message directed to the related radio message receiver is available, the program advances from the step 674 to a step 675. Otherwise, the program returns from the step 674 to the step 660.

The step 675 makes the flag off. A step 676 following the step 675 outputs signals to the peripheral equipments. After the step 676, the program advances to the step 670.

Figure 19:
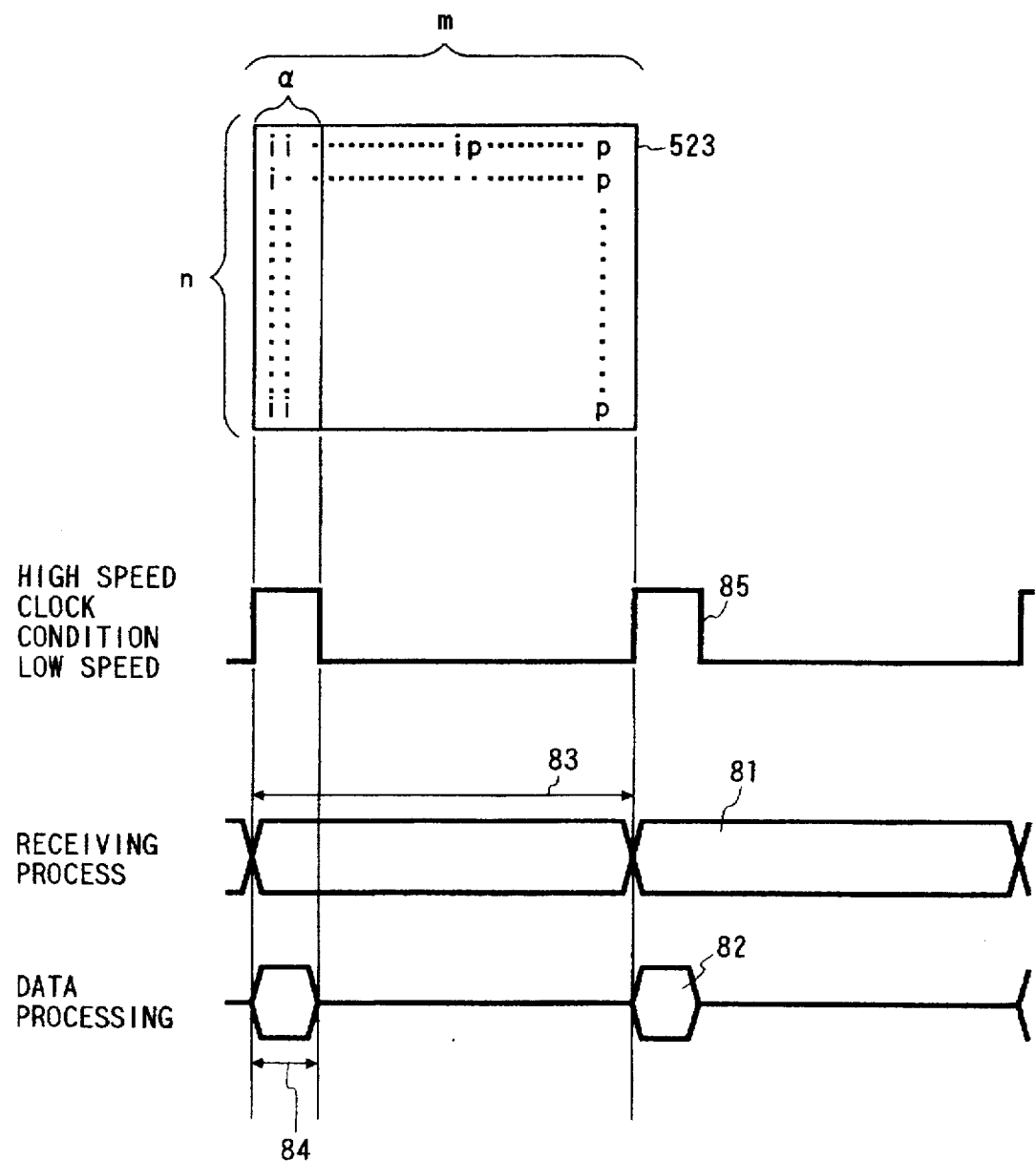
FIG. 19 is a time-domain diagram of reception processing conditions and data processing conditions in the radio message receiver in FIG. 17.

FIG. 19 shows timings of the data processing and the receiving process for a block 523 composed of "n" words in the case where one code word has "m" bits, and an error correction ability corresponds to "α" bits per one code word. In FIG. 19, the numeral denotes a timing of receiving and storing a data sequence of a "k+1" block 523, and the numeral 82 is a timing of the data processing for a "k" block 523. In FIG. 19, the numeral 83 denotes a time of receiving and storing a data sequence of a block 523, and the numeral 84 is a time of receiving "α" data units in the currently-received block in the case where an error correction ability corresponds to "α" bits per one code word. In FIG. 19, the numeral 85 denotes the state of the operation clock of the CPU 624. The high-speed clock is, for example, 1.2288 MHz. The low-speed clock is, for example, 76.8 kHz. The above processes are executed at the timings shown in FIG. 19.

The above operation of the CPU 624 is done in a time 84 shown in FIG. 19. Specifically, in the case where it has an error correction ability of "α" bits per one code word, during an interval for which "α" data units in a "k+1" block are received and they are stored into the buffer, the CPU 624 operates in response to a high-speed clock and thereby processes and ends a data sequence of a "k" block at a high speed. Therefore, a rate of bit errors caused by the affection of the operation of the CPU 624 on the receiving section 622 is suppressed to "α" bits per one code word which is de-interleaved. This is within the range of the error correction ability possessed by that one code word, and error correction is possible. This causes the fact that the speed of the processing of a data sequence is made a high speed and the processing of "m"×"n" bits is done in a time shorter than the time during which "n"×"α" bits are stored into the buffer, and thereby the bit error rate is decreased.

Sixth Embodiment

A sixth embodiment of this invention will now be briefly described. According to the sixth embodiment, a radio paging signal is demodulated into a baseband signal, and the baseband signal is decoded into corresponding data. A detection is made as to a bit error rate of the data. A decision is made as to whether or not the detected bit error rate is higher than a predetermined reference rate. A memory device is operative for storing the data. A processing device is operative for reading out the data from the memory device and processing the readout data. In cases where the detected bit error rate is higher than the predetermined reference rate, operation of the processing device is suspended until a moment after the data stored in the memory device comes into correspondence with a whole of the radio paging signal. The operation of the processing device is started after the data stored in the memory device comes into correspondence with a whole of the radio paging signal.

Figure 20:
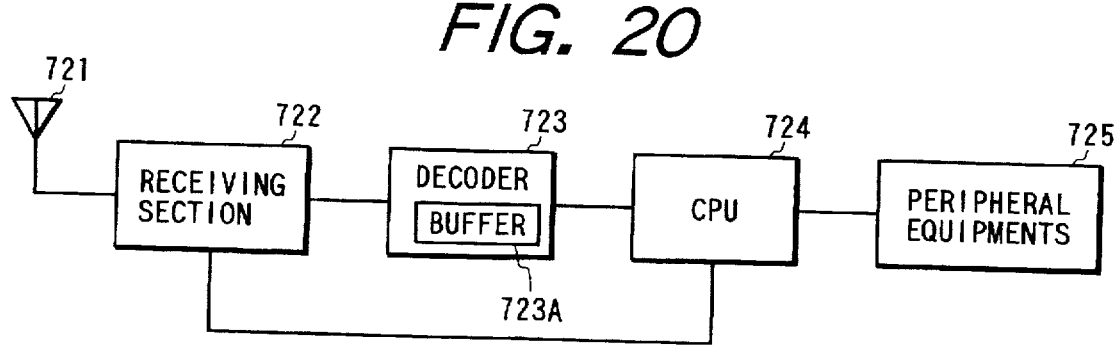
FIG. 20 is a block diagram of a radio message receiver according to a sixth embodiment of this invention.

With reference to FIG. 20, a radio message receiver (a radio paging receiver) includes an antenna 721 followed by a receiving section 722. The antenna 721 serves to catch a radio wave signal transmitted from, for example, a base station. Normally, the radio wave signal includes a paging signal having a sequence of a bit sync signal and an information signal. The bit sync signal has a sequence of bits in predetermined logic states corresponding to a given bit pattern (a sync bit pattern). The information signal represents address information and message information. The address information precedes the message information. The address information includes identification code information. A radio wave signal caught by the antenna 721 is fed to the receiving section 722. The receiving section 722 demodulates the radio wave signal into a corresponding baseband signal.

A decoder 723 following the receiving section 722 receives the baseband signal therefrom, and decodes the baseband signal into corresponding data.

The decoder 723 is connected to a CPU 724 having a combination of an I/O port (an interface), a processing section, a RAM, and a ROM. The CPU 724 may be replaced by a microcomputer, a DSP, or another similar device. The CPU 724 receives the data generated by the decoder 723. The CPU 724 detects or calculates a bit error rate by referring to a portion of the data generated by the decoder 723 which corresponds to a bit sync signal. The CPU 724 processes the remainder of the data generated by the decoder 723. The CPU 724 changes a way of the data processing between two different types in response to the detected bit error rate. Basically, the CPU 724 de-interleaves the received data into second data. The CPU 724 recovers identification code information (address information) from the second data. The CPU 724 is connected to peripheral equipments 725 including a display and a sound generator. The sound generator uses, for example, a loudspeaker. The CPU 724 is also connected to the receiving section 722. The CPU 724 operates in accordance with a program stored in the internal ROM.

As shown in FIG. 12, a head of a paging signal 521 is a sync signal (a bit sync signal) 522 successively followed by blocks 523 having data. The sync signal 522 has a sequence of bits in predetermined logic states corresponding to a given bit pattern (a sync bit pattern). Data in each block 523 is interleaved in unit of "n" words, where "n" denotes a given integer. The total number of the blocks 523 is equal to a given number "j". In general, one or more former blocks 523 represent identification code information (address information) while latter blocks 523 represent message information.

As shown in FIG. 13, one block has a capacity of "m" bits by "n" words, where "m" denotes a given integer. Each word has a fixed length equal to "m" bits. Each word has bits 524 representing main information, and bits 525 representing error correction code information. The main information contains identification code information (address information) or message information. A used error correction code has an error correction ability corresponding to "α" bits, where "α" denotes a given integer. In FIG. 13, the numeral 526 denotes an n-bit data unit subjected to an interleaving process and composed of equal-order-number bits in the respective words. In a base station (a transmitting station), data in one block 523 is divided into "m" data units. The base station sequentially transmit "m" data units for every block 523.

The decoder 723 includes a bit sync section for generating a sampling clock signal from the output signal of the receiving section 722 which corresponds to a former part of a bit sync signal 522 in a paging signal 521. The decoder 723 includes a sampling section which periodically samples the output signal of the receiving section 722 in response to the sampling clock signal to decode the output signal of the receiving section 722 into first data bit by bit. The decoder 723 feeds the CPU 724 with a former portion of the first data which corresponds to a latter part of the bit sync signal 522 in the paging signal 521. Thus, the former portion of the first data is bit sync data. The decoder 723 includes a large-capacity buffer memory 723A. Portions of the first data which correspond to respective blocks 523 in the paging signal 521 are sequentially written into different areas of the buffer memory 723A respectively. The buffer memory 723A can be accessed by the CPU 724 so that the first data can be read out therefrom by the CPU 724. When the writing into the buffer memory 723A in the decoder 723 reaches a given value, the decoder 723 outputs a specified signal to the CPU 724. Here, the given value corresponds to "n" bits.

The CPU 724 operates in accordance with a program stored in the internal ROM. A unit of processing by the CPU 724 is one code word ("m" bits) in one block. When the CPU 724 receives an address assigned to the related radio message receiver, the CPU 724 recognizes a position and a size of a message directed to the related radio message receiver. The CPU 724 recognizes the number of code words in one block.

Figure 21:
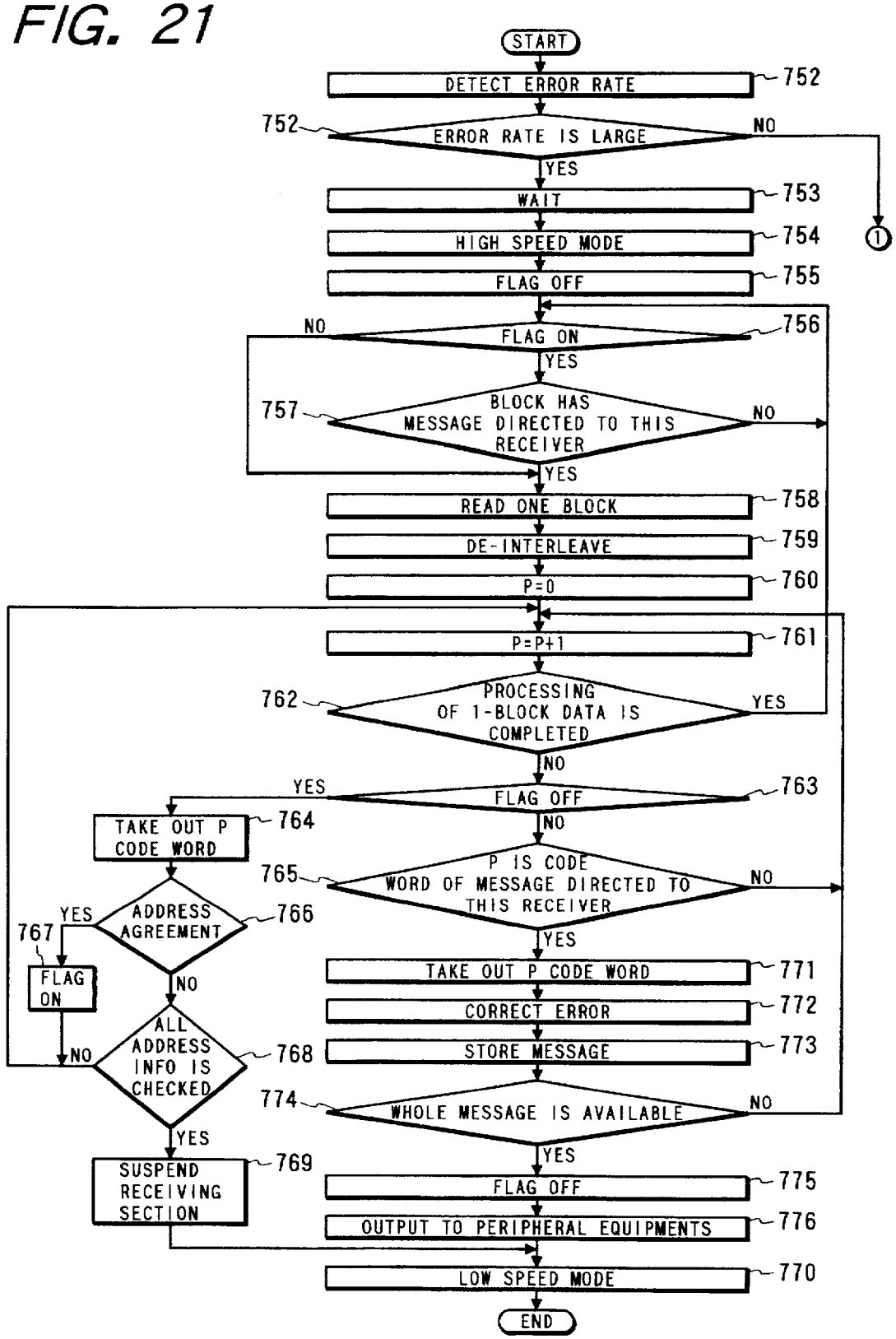
FIGS. 21 and 22 are a flowchart of a segment of a program for controlling a CPU in FIG. 20.
Figure 22:
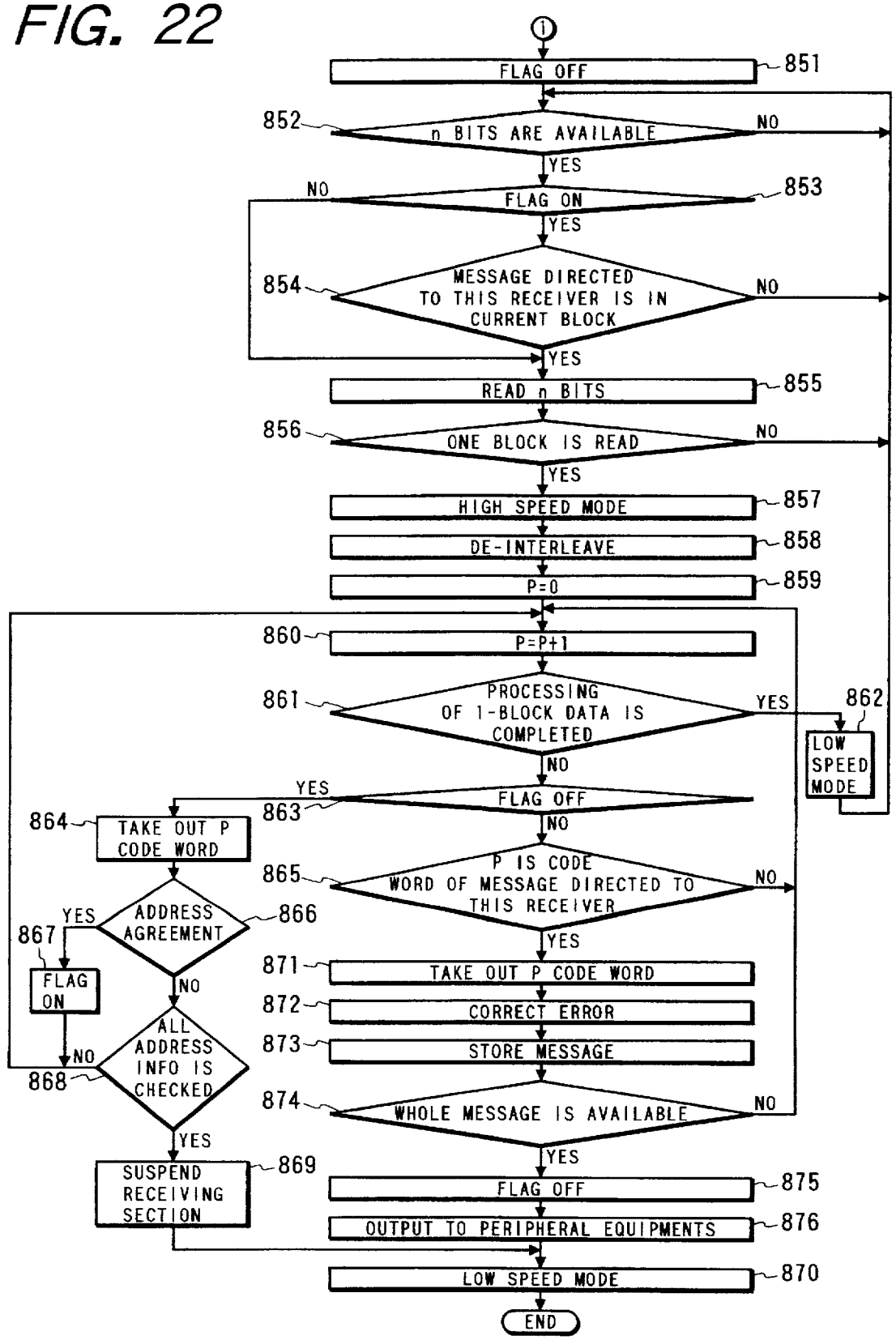

FIGS. 21 and 22 are a flowchart of a segment of the program which is executed each time a paging signal 521 is received. As shown in FIG. 21, a first step 751 of the program segment calculates an error rate. The step 751 is similar to the step 351 in FIG. 10. A step 752 following the step 751 decides whether or not the error rate is large. When the error rate is large, the program advances from the step 752 to a step 753. Otherwise, the program advances from the step 752 to a step 851 of FIG. 22.

The step 753 waits a given time interval. A step 754 following the step 753 puts the CPU 724 into a high-speed operation mode. A step 755 subsequent to the step 754 makes a message reception flag off. The message reception flag will be simply referred to as the flag. After the step 755, the program advances to a step 756.

The step 756 decides whether or not the flag is on. When the flag is on, the program advances from the step 756 to a step 757. Otherwise, the program advances from the step 756 to a step 758. The step 757 decides whether or not a message directed to the related radio message receiver is in the current block. When a message directed to the related radio message receiver is in the current block, the program advances from the step 757 to the step 758. Otherwise, the program returns from the step 757 to the step 756.

The step 758 reads one block. A step 759 following the step 758 executes a de-interleaving process. A step 760 subsequent to the step 759 sets a variable P to "0". The variable P represents a code word order number. After the step 760, the program advances to a step 761. The step 761 increments the number P by "1". A step 762 subsequent to the step 761 decides whether or not the processing of 1-block data is completed. When the processing of 1-block data is completed, the program returns from the step 762 to the step 756. Otherwise, the program advances from the step 762 to a step 763.

The step 763 decides whether or not the flag is off. When the flag is off, the program advances from the step 763 to a step 764. Otherwise, the program advances from the step 763 to a step 765.

The step 764 takes out a code word having an order number equal to the number P. A step 766 following the step 764 decides whether or not addresses agree with each other. When the addresses agree with each other, the program advances from the step 766 to a step 767. Otherwise, the program advances from the step 766 to a step 768. The step 766 is similar to the step 442 in FIGS. 14 and 15. The step 767 makes the flag on. After the step 767, the program returns to the step 761.

The step 768 decides whether or not all the address information has been checked. When all the address information has been checked, the program advances from the step 768 to a step 769. Otherwise, the program returns from the step 768 to the step 761. The step 679 suspends the operation of the receiving section. After the step 769, the program advances to a step 770. The step 770 puts the CPU 724 into a low-speed operation mode.

After the step 770, the current execution cycle of the program segment ends.

The step 765 decides whether or not the number P corresponds to a code word of a message directed to the related radio message receiver. When the number P corresponds to a code word of a message directed to the related radio message receiver, the program advances from the step 765 to a step 771. Otherwise, the program returns from the step 765 to the step 761.

The step 771 takes out a code word having an order number equal to the number P. A step 772 following the step 771 executes error correction. A step 773 subsequent to the step 772 stores the message. A step 774 following the step 773 decides whether or the whole of the message directed to the related radio message receiver is available. When the whole of the message directed to the related radio message receiver is available, the program advances from the step 774 to a step 775. Otherwise, the program returns from the step 774 to the step 761.

The step 775 makes the flag off. A step 776 following the step 775 outputs signals to the peripheral equipments. After the step 776, the program advances to the step 770.

The step 851 in FIG. 22 makes the flag off. After the step 851, the program advances to a step 852. The step 852 decides whether or not the "n" bits are available. When the "n" bits are available, the program advances from the step 852 to a step 853. Otherwise, the step 852 is repeated.

The step 853 decides whether or not the flag is on. When the flag is on, the program advances from the step 853 to a step 854. Otherwise, the program advances from the step 853 to a step 855. The step 854 decides whether or not a message directed to the related radio message receiver is in the current block. When a message directed to the related radio message receiver is in the current block, the program advances from the step 854 to the step 855. Otherwise, the program returns from the step 854 to the step 852.

The step 855 reads the "n" bits. A step 856 following the step 855 decides whether or not one block has been read. When one block has been read, the program advances from the step 856 to a step 857. Otherwise, the program returns from the step 856 to the step 852.

The step 857 puts the CPU 724 into the high-speed operation mode. A step 858 following the step 857 executes a de-interleaving process. A step 859 subsequent to the step 858 sets a variable P to "0". The variable P represents a code word order number. After the step 859, the program advances to a step 860. The step 860 increments the number P by "1". A step 861 subsequent to the step 860 decides whether or not the processing of 1-block data is completed. When the processing of 1-block data is completed, the program advances from the step 861 to a step 862. Otherwise, the program advances from the step 861 to a step 863.

The step 862 puts the CPU 724 into the low-speed operation mode. After the step 862, the program returns to the step 852. The step 863 decides whether or not the flag is off. When the flag is off, the program advances from the step 863 to a step 864. Otherwise, the program advances from the step 863 to a step 865.

The step 864 takes out a code word having an order number equal to the number P. A step 866 following the step 864 decides whether or not addresses agree with each other. When the addresses agree with each other, the program advances from the step 866 to a step 867. Otherwise, the program advances from the step 866 to a step 868. The step 866 is similar to the step 442 in FIGS. 14 and 15. The step 867 makes the flag on. After the step 867, the program returns to the step 860.

The step 868 decides whether or not all the address information has been checked. When all the address information has been checked, the program advances from the step 868 to a step 869. Otherwise, the program returns from the step 868 to the step 860. The step 869 suspends the operation of the receiving section. After the step 869, the program advances to a step 870. The step 870 puts the CPU 724 into the low-speed operation mode. After the step 870, the current execution cycle of the program segment ends.

The step 865 decides whether or not the letter P corresponds to a code word of a message directed to the related radio message receiver. When the number P corresponds to a code word of a message directed to the related radio message receiver, the program advances from the step 865 to a step 871. Otherwise, the program returns from the step 865 to the step 860.

The step 871 takes out a code word having an order number equal to the number P. A step 872 following the step 871 executes error correction. A step 873 subsequent to the step 872 stores the message. A step 874 following the step 873 decides whether or not the whole message directed to the related radio message receiver is available. When the whole message directed to the related radio message receiver is available, the program advances from the step 874 to a step 875. Otherwise, the program returns from the step 874 to the step 860.

The step 875 makes the flag off. A step 876 following the step 875 outputs signals to the peripheral equipments. After the step 876, the program advances to the step 870.

This embodiment is advantageous in quickly recovering complete message information. This embodiment has the following advantages. In the case where the error rate is high, the CPU is made not in operation during the reception to minimize the influence (the noise) on the receiving process to make the reception sensitivity better. In the case where the error rate is low, the received data is sequentially processed by the CPU during the reception, and only necessary data is processed on the basis of information generated as a result of the analysis (the data processing by the CPU) so that the processing time is shortened and therefore the consumed electric power is suppressed. There is an advantage such that these two reciprocal performance items are made feasible. This embodiment has advantages similar to those provided by the third embodiment.

What is claimed is:

1. A message receiving apparatus comprising:

first means for demodulating a radio paging signal into a baseband signal;

second means for decoding the baseband signal into corresponding data;

third means for recovering address information from the data generated by the second means;

fourth means for recovering message information from the data generated by the second means;

fifth means for subjecting the recovered message information to an error correction process; and sixth means for preventing the recovered address information from being subjected to the error correction process;

seventh means for deciding whether or not the address information recovered by the third means is substantially equal to predetermined address information; and eighth means for deactivating the first means during a given time interval in cases where the seventh means decides that the address information recovered by the third means is not substantially equal to the predetermined address information.

2. The message receiving apparatus of claim 1, wherein the seventh means comprises means for detecting error bits in the recovered address information which differ in logic state from corresponding bits in the predetermined address information, means for calculating a number of the detected error bits, and means for deciding whether or not the address information recovered by the third means is substantially equal to the predetermined address information in response to the calculated error bit number.

3. A message receiving apparatus comprising:

first means for demodulating a radio paging signal into a baseband signal;

second means for decoding the baseband signal into corresponding data;

a CPU alternately executing processing of the data and another job;

third means for generating first and second clock signals having first and second predetermined frequencies respectively, the first predetermined frequency being higher than the second predetermined frequency;

fourth means for operating the CPU in response to the first clock signal when the CPU executes the processing of the data; and fifth means for operating the CPU in response to the second clock signal when the CPU executes said other job;

wherein there is provided a clock generator generating a frequency at which the CPU has a speed of data processing of "m"×"n" bits during a time for which a receiving section receives "n"×"α" bits in the case where an error correction ability in the CPU is "α" bits when data interleaved "m" bits/word×"n" words.

4. A message receiving apparatus comprising:

first means for demodulating a radio paging signal into a baseband signal;

second means for decoding the baseband signal into corresponding data;

third means for detecting a bit error rate of the data generated by the second means;

fourth means for deciding whether or not the detected bit error rate is higher than a predetermined reference rate;

fifth means for storing the data generated by the second means;

sixth means for reading out the data from the fifth means and processing the readout data; and seventh means for, in cases where the fourth means decides that the detected bit error rate is higher than the predetermined reference rate, suspending operation of the sixth means until a moment after the data stored in the fifth means comes into correspondence with a whole of the radio paging signal, and then starting the operation of the sixth means after the data stored in the fifth means comes into correspondence with a whole of the radio paging signal.

* * * * *